(12) United States Patent
Manolakos et al.

(10) Patent No.: US 11,140,687 B2
(45) Date of Patent: Oct. 5, 2021

(54) SOUNDING REFERENCE SIGNAL PARAMETER DETERMINATION TECHNIQUES

(71) Applicant: QUALCOMM Incorporated, San Diego, CA (US)

(72) Inventors: Alexandros Manolakos, San Diego, CA (US); Sony Akkarakaran, Poway, CA (US); Amir Aminzadeh Gohari, Sunnyvale, CA (US); June Namgoong, San Diego, CA (US); Joseph Binamira Soriaga, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/576,535

(22) Filed: Sep. 19, 2019

(65) Prior Publication Data

US 2020/0112970 A1 Apr. 9, 2020

(30) Foreign Application Priority Data

Oct. 5, 2018 (GR) .............................. 20180100459

(51) Int. Cl.
*H04W 72/10* (2009.01)
*H04W 72/04* (2009.01)
(Continued)

(52) U.S. Cl.
CPC ........... *H04W 72/10* (2013.01); *H04L 5/0051* (2013.01); *H04L 25/0226* (2013.01); *H04W 52/242* (2013.01); *H04W 72/0446* (2013.01)

(58) Field of Classification Search
CPC .............. H04W 72/10; H04W 52/242; H04W 72/0446; H04L 5/0051; H04L 25/0226
(Continued)

(56) References Cited

U.S. PATENT DOCUMENTS

2012/0252474 A1* 10/2012 Tiirola .................. H04L 5/0053
455/450
2013/0223394 A1* 8/2013 Nishio .................. H04L 1/0029
370/329
(Continued)

FOREIGN PATENT DOCUMENTS

WO WO-2014109686 A1 * 7/2014 ........... H04L 5/0048
WO WO-2019158064 A1 8/2019
WO WO-2019190236 A1 10/2019

OTHER PUBLICATIONS

CATT: "Remaining Issues on Non-Codebook Based UL Transmission", 3GPP TSG RAN WG1 Meeting AH 1801, 3GPP Draft; R1-1800238, vol. RAN WG1, No. Vancouver, Canada; Jan. 22, 2018-Jan. 26, 2018, Jan. 13, 2018 (Jan. 13, 2018), 5 Pages, XP051384717, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018], Sections 1-4.
(Continued)

*Primary Examiner* — Obaidul Huq
(74) *Attorney, Agent, or Firm* — Qualcomm Incorporated

(57) ABSTRACT

Methods, systems, and devices for wireless communications are described for determination of sounding reference signal (SRS) parameters when multiple SRS resource sets are configured for a same SRS transmission resource. A user equipment (UE) may select one SRS resource set for a SRS transmission based on a prioritization of different SRS resource sets. In some cases, different SRS resource sets may be associated with different SRS usage parameters that indicate a use case for the SRS, and the UE may transmit a
(Continued)

joint SRS for two or more SRS resource sets for predetermined combinations of SRS usage parameters. A base station that receives the SRS transmission may measure one or more channel parameters of the SRS and determine one or more settings for subsequent communications with the UE.

32 Claims, 15 Drawing Sheets

(51) Int. Cl.
*H04W 52/24* (2009.01)
*H04L 5/00* (2006.01)
*H04L 25/02* (2006.01)

(58) Field of Classification Search
USPC .......................................... 370/310, 328, 329
See application file for complete search history.

(56) References Cited

U.S. PATENT DOCUMENTS

2019/0281588 A1* 9/2019 Zhang .................. H04W 52/08
2020/0274668 A1* 8/2020 Yamada ................ H04W 24/10

OTHER PUBLICATIONS

CMCC: "Discussion on Remaining Issues on SRS", 3GPP TSG RAN WG 1 Meeting #94, 3GPP Draft; R1-1811030, vol. RAN WG1. No. Chengdu. China; Oct. 8, 2018-Oct. 12, 2018, Sep. 29, 2018 (Sep. 29, 2018), 4 Pages, XP051518432, Retrieved from the Internet: URL: http://www.3gpp.org/ftp/tsg%5Fran/WG1%5FRL1/TSGR1%5F94b/Docs/R1%2D1811030%2Ezip [retrieved on Sep. 29, 2018] Sections 1-3.
International Search Report and Written Opinion—PCT/US2019/052229—ISA/EPO—dated Dec. 3, 2019.

* cited by examiner

SOUNDING REFERENCE SIGNAL PARAMETER DETERMINATION TECHNIQUES

CROSS REFERENCE

The present application for patent claims the benefit of Greece Provisional Patent Application No. 20180100459 by MANOLAKOS et al., entitled "SOUNDING REFERENCE SIGNAL PARAMETER DETERMINATION TECHNIQUES," filed Oct. 5, 2018, assigned to the assignee hereof, and which is expressly incorporated by reference herein.

BACKGROUND

The following relates generally to wireless communications, and more specifically to sounding reference signal parameter determination techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support sounding reference signal (SRS) parameter determination techniques. Various aspects of the disclosure provide techniques for transmitting a SRS when multiple SRS resource sets are configured for a same SRS transmission resource. In some cases, a user equipment (UE) may select one SRS resource set for a SRS transmission based on a prioritization of different SRS resource sets. Such a prioritization may be based on an identification associated with each SRS resource set, a specified prioritization, a configured prioritization, a randomized prioritization, a round-robin prioritization, or combinations thereof. In some cases, different SRS resource sets may be associated with different SRS usage parameters that indicate a use case for the SRS, and the UE may transmit a joint SRS for two or more SRS resource sets for predetermined combinations of SRS usage parameters. A base station that receives the SRS transmission may measure one or more channel parameters of the SRS and determine one or more settings for subsequent communications with the UE.

A method of wireless communication at a UE is described. The method may include receiving configuration information for at least a first SRS resource set and a second SRS resource set, the first SRS resource set and the second SRS resource set each including two or more parameters for an associated SRS transmission, determining that the first SRS resource set and the second SRS resource set correspond to a same transmission resource, selecting the first SRS resource set for a first SRS communication using the transmission resource based on a prioritization associated with each of the first SRS resource set and the second SRS resource set, and transmitting the first SRS communication based on one or more SRS transmission parameters associated with the first SRS resource set.

An apparatus for wireless communication at a UE is described. The apparatus may include a processor, memory in electronic communication with the processor, and instructions stored in the memory. The instructions may be executable by the processor to cause the apparatus to receive configuration information for at least a first SRS resource set and a second SRS resource set, the first SRS resource set and the second SRS resource set each including two or more parameters for an associated SRS transmission, determine that the first SRS resource set and the second SRS resource set correspond to a same transmission resource, select the first SRS resource set for a first SRS communication using the transmission resource based on a prioritization associated with each of the first SRS resource set and the second SRS resource set, and transmit the first SRS communication based on one or more SRS transmission parameters associated with the first SRS resource set.

Another apparatus for wireless communication at a UE is described. The apparatus may include means for receiving configuration information for at least a first SRS resource set and a second SRS resource set, the first SRS resource set and the second SRS resource set each including two or more parameters for an associated SRS transmission, determining that the first SRS resource set and the second SRS resource set correspond to a same transmission resource, selecting the first SRS resource set for a first SRS communication using the transmission resource based on a prioritization associated with each of the first SRS resource set and the second SRS resource set, and transmitting the first SRS communication based on one or more SRS transmission parameters associated with the first SRS resource set.

A non-transitory computer-readable medium storing code for wireless communication at a UE is described. The code may include instructions executable by a processor to receive configuration information for at least a first SRS resource set and a second SRS resource set, the first SRS resource set and the second SRS resource set each including two or more parameters for an associated SRS transmission, determine that the first SRS resource set and the second SRS resource set correspond to a same transmission resource, select the first SRS resource set for a first SRS communication using the transmission resource based on a prioritization associated with each of the first SRS resource set and the second SRS resource set, and transmit the first SRS communication based on one or more SRS transmission parameters associated with the first SRS resource set.

In some examples of the method, apparatuses, and non-transitory computer-readable medium described herein, the prioritization may be based on one or more of a resource set identification value of each of the first SRS resource set and the second SRS resource set, a configured resource set identification priority; or a priority based on a usage parameter of each of the first SRS resource set and the second SRS resource set. In some examples of the method, apparatuses, and non-transitory computer-readable medium described herein, the transmitting may include operations, features, means, or instructions for precoding one or more antenna ports of the first SRS communication based on the one or more SRS transmission parameters associated with the first SRS resource set. In some examples of the method, apparatuses, and non-transitory computer-readable medium described herein, the prioritization may be a random prioritization. In some examples of the method, apparatuses, and non-transitory computer-readable medium described herein, the prioritization provides for alternating between the first SRS resource set and the second SRS resource set in consecutive SRS transmissions that may be associated with both the first SRS resource set and the second SRS resource set.

Some examples of the method, apparatuses, and non-transitory computer-readable medium described herein may further include operations, features, means, or instructions for determining that the first SRS resource set and the second SRS resource set are associated with parameters that can be satisfied in a same SRS transmission, and where the first SRS communication is transmitted based on one or more SRS transmission parameters associated with both the first SRS resource set and the second SRS resource set. In some examples of the method, apparatuses, and non-transitory computer-readable medium described herein, the prioritization includes one or more combinations of SRS usage parameters that indicate that a same SRS transmission may be used for both the first SRS resource set and the second SRS resource set. In some examples of the method, apparatuses, and non-transitory computer-readable medium described herein, the configuration information further indicates a priority associated with each SRS resource set.

Some examples of the method, apparatuses, and non-transitory computer-readable medium described herein may further include operations, features, means, or instructions for determining that the first SRS resource set and the second SRS resource set are each associated with a single antenna port, and where the first SRS communication is transmitted based on one or more SRS transmission parameters associated with both the first SRS resource set and the second SRS resource set.

Some examples of the method, apparatuses, and non-transitory computer-readable medium described herein may further include operations, features, means, or instructions for determining that the first SRS resource set and the second SRS resource set each have a same periodicity and transmitting the first SRS communication further based on one or more SRS transmission parameters associated with both the first SRS resource set and the second SRS resource set.

In some examples of the method, apparatuses, and non-transitory computer-readable medium described herein, the two or more parameters of each SRS resource set include one or more of a resource type associated with the SRS resource set or power control parameters associated with the SRS resource set. In some examples of the method, apparatuses, and non-transitory computer-readable medium described herein, the resource type indicates a periodic SRS configuration, a semi-persistent SRS configuration, or an aperiodic SRS configuration. In some examples of the method, apparatuses, and non-transitory computer-readable medium described herein, the power control parameters indicate one or more of a pathloss reference signal, an initial transmission power for the associated SRS transmissions, or a power control adjustment state for the associated SRS transmissions. In some examples of the method, apparatuses, and non-transitory computer-readable medium described herein, the transmission resource may be determined based on a symbol identification within a transmission slot and a transmission slot index and periodicity for semi-persistent or periodic SRS transmissions, or a trigger that initiates an aperiodic SRS transmission. In some examples of the method, apparatuses, and non-transitory computer-readable medium described herein, the first SRS resource set and the second SRS resource set include an associated usage parameter that indicates an uplink codebook-based channel quality determination, an uplink non-codebook precoding determination; an uplink analog beamforming determination, or an antenna switching procedure at the UE.

A method of wireless communication at a base station is described. The method may include transmitting configuration information to a UE for at least a first SRS resource set and a second SRS resource set, the first SRS resource set and the second SRS resource set each including two or more parameters for an associated SRS transmission, identifying that the first SRS resource set and the second SRS resource set correspond to a same transmission resource, determining that the first SRS resource set is associated with the transmission resource based on a prioritization associated with each of the first SRS resource set and the second SRS resource set, and measuring one or more channel characteristics of a SRS transmission received from the UE on the transmission resource based on one or more SRS transmission parameters associated with the first SRS resource set.

An apparatus for wireless communication at a base station is described. The apparatus may include a processor, memory in electronic communication with the processor, and instructions stored in the memory. The instructions may be executable by the processor to cause the apparatus to transmit configuration information to a UE for at least a first SRS resource set and a second SRS resource set, the first SRS resource set and the second SRS resource set each including two or more parameters for an associated SRS transmission, identify that the first SRS resource set and the second SRS resource set correspond to a same transmission resource, determine that the first SRS resource set is associated with the transmission resource based on a prioritization associated with each of the first SRS resource set and the second SRS resource set, and measure one or more channel characteristics of a SRS transmission received from the UE on the transmission resource based on one or more SRS transmission parameters associated with the first SRS resource set.

Another apparatus for wireless communication at a base station is described. The apparatus may include means for transmitting configuration information to a UE for at least a first SRS resource set and a second SRS resource set, the first SRS resource set and the second SRS resource set each including two or more parameters for an associated SRS transmission, identifying that the first SRS resource set and the second SRS resource set correspond to a same transmission resource, determining that the first SRS resource set is associated with the transmission resource based on a prioritization associated with each of the first SRS resource set and the second SRS resource set, and measuring one or more channel characteristics of a SRS transmission received from the UE on the transmission resource based on one or more SRS transmission parameters associated with the first SRS resource set.

A non-transitory computer-readable medium storing code for wireless communication at a base station is described. The code may include instructions executable by a processor to transmit configuration information to a UE for at least a first SRS resource set and a second SRS resource set, the first SRS resource set and the second SRS resource set each including two or more parameters for an associated SRS transmission, identify that the first SRS resource set and the second SRS resource set correspond to a same transmission resource, determine that the first SRS resource set is associated with the transmission resource based on a prioritization associated with each of the first SRS resource set and the second SRS resource set, and measure one or more channel characteristics of a SRS transmission received from the UE on the transmission resource based on one or more SRS transmission parameters associated with the first SRS resource set.

In some examples of the method, apparatuses, and non-transitory computer-readable medium described herein, the prioritization may be based on one or more of a resource set identification value of each of the first SRS resource set and the second SRS resource set, a configured resource set identification priority; or a priority based on a usage parameter of each of the first SRS resource set and the second SRS resource set. In some examples of the method, apparatuses, and non-transitory computer-readable medium described herein, the prioritization may be a random prioritization and the determining may be further based on the one or more measured channel characteristics. In some examples of the method, apparatuses, and non-transitory computer-readable medium described herein, the prioritization provides for alternating between the first SRS resource set and the second SRS resource set in consecutive SRS transmissions that may be associated with both the first SRS resource set and the second SRS resource set.

In some examples of the method, apparatuses, and non-transitory computer-readable medium described herein, the configuration information further includes one or more of a priority associated with each SRS resource set, or one or more combinations of parameters that indicate that a same SRS transmission may be used for both the first SRS resource set and the second SRS resource set.

Some examples of the method, apparatuses, and non-transitory computer-readable medium described herein may further include operations, features, means, or instructions for determining that the first SRS resource set and the second SRS resource set are each associated with a single antenna port, and where the SRS transmission are further measured based on one or more SRS transmission parameters associated with both the first SRS resource set and the second SRS resource set.

Some examples of the method, apparatuses, and non-transitory computer-readable medium described herein may further include operations, features, means, or instructions for determining that the first SRS resource set and the second SRS resource set each have a same periodicity and measuring the SRS transmission further based on one or more SRS transmission parameters associated with both the first SRS resource set and the second SRS resource set.

In some examples of the method, apparatuses, and non-transitory computer-readable medium described herein, the two or more parameters of each SRS resource set include one or more of a resource type associated with the SRS resource set or power control parameters associated with the SRS resource set. In some examples of the method, apparatuses, and non-transitory computer-readable medium described herein, the resource type indicates a periodic SRS configuration, a semi-persistent SRS configuration, or an aperiodic SRS configuration. In some examples of the method, apparatuses, and non-transitory computer-readable medium described herein, the power control parameters indicate one or more of a pathloss reference signal, an initial transmission power for the associated SRS transmissions, or a power control adjustment state for the associated SRS transmissions. In some examples of the method, apparatuses, and non-transitory computer-readable medium described herein, the transmission resource may be determined based on a symbol identification within a transmission slot and a transmission slot index and periodicity for semi-persistent or periodic SRS transmissions, or a trigger that initiates an aperiodic SRS transmission. In some examples of the method, apparatuses, and non-transitory computer-readable medium described herein, the first SRS resource set and the second SRS resource set include an associated usage parameter that indicates an uplink codebook-based channel quality determination, an uplink non-codebook precoding determination; an uplink analog beamforming determination, or an antenna switching procedure at the UE.

DETAILED DESCRIPTION

Figure 1:
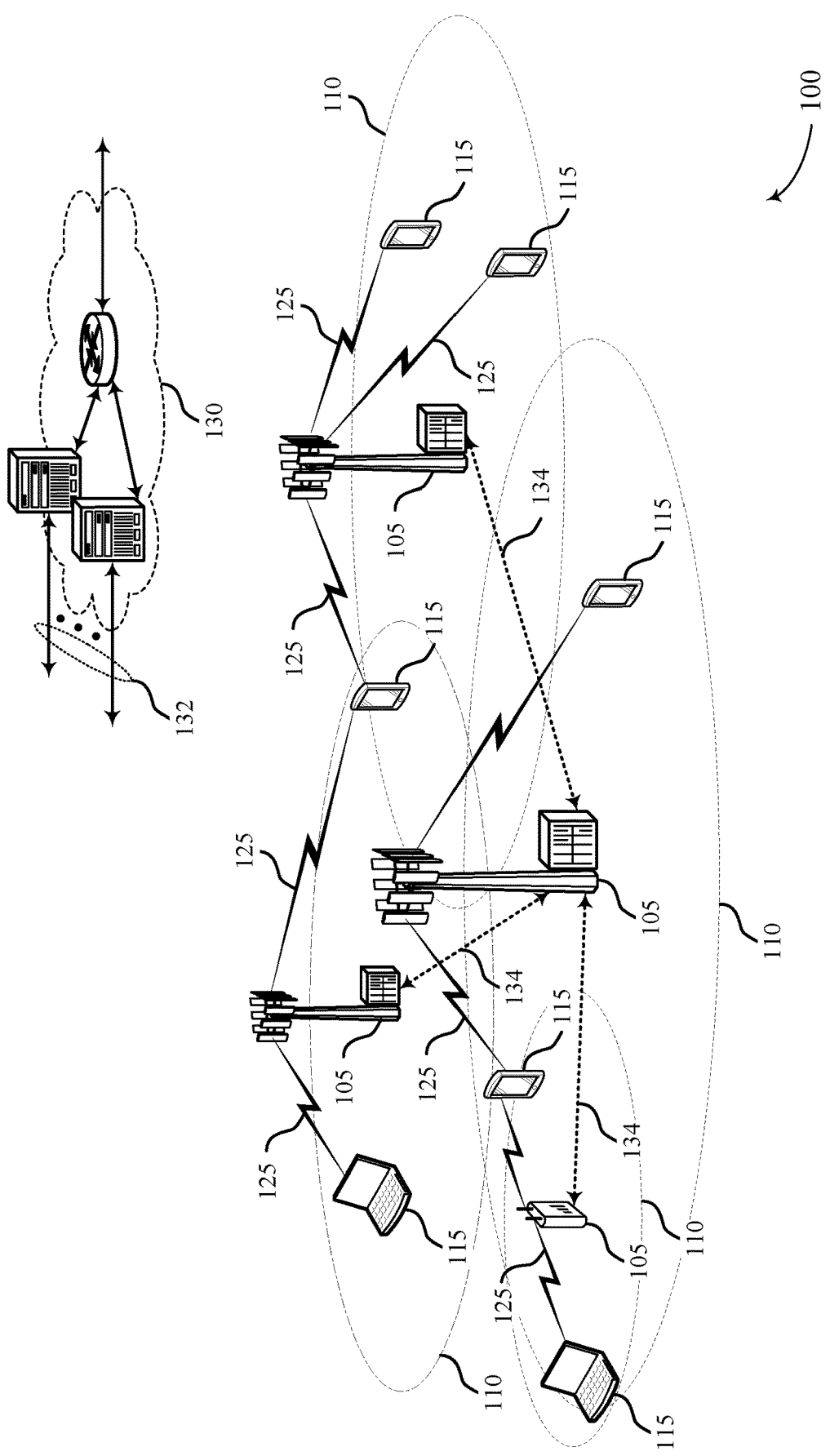
FIG. 1 illustrates an example of a system for wireless communications that supports sounding reference signal (SRS) parameter determination techniques in accordance with aspects of the present disclosure.

Various aspects of the present disclosure provide sounding reference signal (SRS) parameter determination techniques. As discussed herein, in some cases a user equipment (UE) may be configured with multiple SRS resource sets that are used to determine parameters for associated SRS transmissions. Each SRS resource set may be associated with a different use case for the SRS, which may include an uplink codebook-based SRS, uplink non-codebook SRS for determining precoding, analog beamforming SRS, and antenna switching SRS. In some cases, two or more of the SRS resource sets configured at a UE may be mapped to a same SRS transmission resource (e.g., a same antenna port during an orthogonal frequency division multiplexing (OFDM) symbol that is allocated for SRS transmission). In such cases, one or more parameters of the two or more SRS resource sets may be different (e.g., different SRS resource sets may have different precoding or antenna virtualization). Techniques such as discussed herein provide for determination of which of the two or more SRS resource sets may be selected for an SRS transmission via the SRS transmission resource (e.g., defined in Radio Resource Control (RRC) or in location positioning protocol (LPP)).

In some cases, a prioritization is used to determine which of the two or more SRS resource sets are to be used for a SRS transmission. Such a prioritization may be based on an identification associated with each SRS resource set, a specified prioritization, a configured prioritization, a randomized prioritization, a round-robin prioritization, or combinations thereof. In some cases, a UE may apply multiple SRS resource sets to a single SRS transmission based at least in part on one or more allowed combinations of SRS resource sets that may use a same SRS transmission resource. For example, a first combination of SRS resource sets for uplink codebook and antenna switching use cases may be allowed to use a same SRS transmission resource, and a second combination of SRS resource sets for non-codebook precoding and antenna switching use cases may not be allowed to use a same SRS transmission resource. Such allowable combinations may be determined, in some cases, based at least in part on a usage parameter that indicates the use case of the SRS resource sets. In some cases, one or more use case combinations of SRS resource sets that may use a same SRS transmission resource may be allowed based on UE capability.

In some cases, prioritization of SRS resource sets may be based on a number of antenna ports associated with the SRS resource sets. For example, if a SRS resource (e.g., configured through LPP) in two SRS resource sets is a single antenna port resource the UE may transmit a joint SRS for both SRS resource sets, but if one of the SRS resource sets has two or more antenna ports the UE may prioritize between the SRS resource sets. Additionally or alternatively, if two SRS resource sets are periodic with a same periodicity the UE may transmit a SRS according to both of the two SRS resource sets, and if the two SRS resource sets are aperiodic the UE may select one of the two SRS resource sets according to a prioritization associated with the two SRS resource sets.

Such techniques may allow a UE to transmit SRS using one or more parameters (e.g., a precoding or antenna virtualization) of a selected resource set, or using parameters of multiple resource sets in identified cases, which may provide improved measurements of SRS at a base station for particular use cases associated with the selected SRS resource set(s). Further, such techniques may reduce complexity for SRS transmissions at a UE, which may enhance UE performance and reduce power consumption. Additionally, such techniques may avoid the occurrence of conflicting SRS resources where a UE would have unspecified performance.

Particular aspects of the subject matter described herein may be implemented to realize one or more advantages. The described techniques may support improvements in selecting between the SRS resource sets, with a shared transmission resource, based at least in part on a prioritization. These techniques may increase reliability and reduce latency, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to apparatus diagrams, system diagrams, and flowcharts that relate to SRS parameter determination techniques.

FIG. 1 illustrates an example of a wireless communications system 100 that supports SRS parameter determination techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, multiple SRS resource sets may be configured at a UE 115 that use a same SRS transmission resource, and the UE 115 may determine SRS parameters for an SRS transmission using the SRS transmission resource according to techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, (e.g., in the range of 300 MHz to 300 GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, a base station 105 may configure a UE 115 with multiple SRS resource sets for SRS transmissions that may be used by the base station 105 to evaluate uplink channel quality and uplink timing for different use cases. In some cases, two or more of the SRS resource sets may be configured for a same SRS transmission resource, and the UE 115 may select one SRS resource set for a SRS transmission based on a prioritization of different SRS resource sets. In some cases, different SRS resource sets may be associated with different SRS usage parameters that indicate different use cases for the SRS, and the UE 115 may transmit a joint SRS for two or more SRS resource sets for predetermined combinations of SRS usage parameters. The base station 105 may receive the SRS transmission, measure one or more channel parameters of the SRS and determine one or more settings for subsequent communications with the UE 115.

Figure 2:
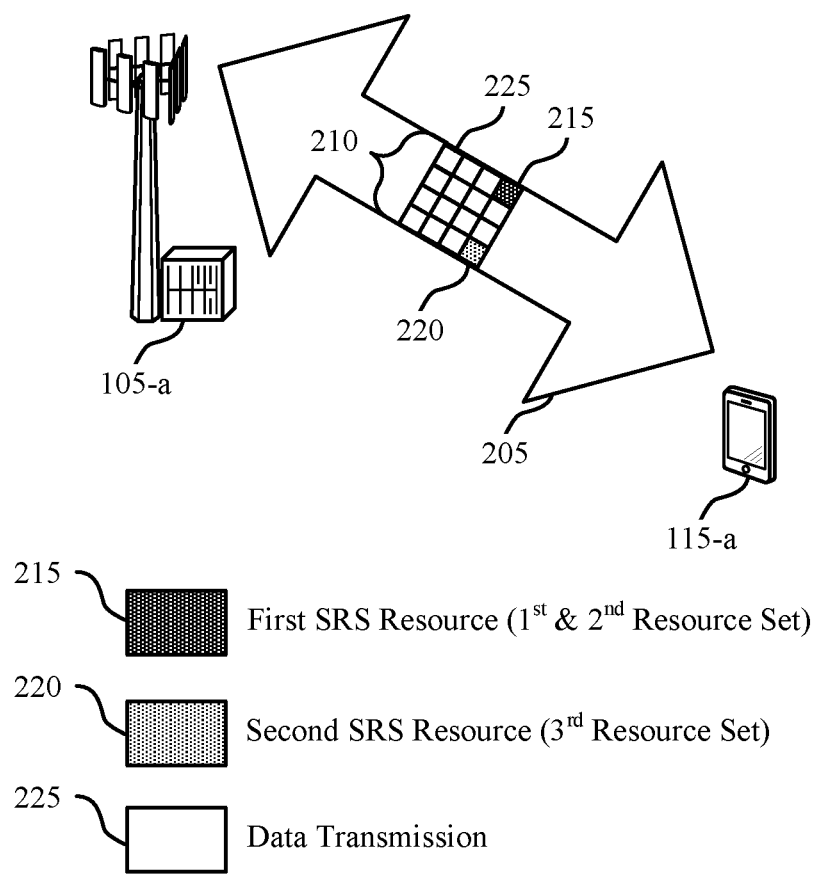
FIG. 2 illustrates an example of a portion of a wireless communications system that supports SRS parameter determination techniques in accordance with aspects of the present disclosure.

FIG. 2 illustrates an example of a wireless communications system 200 that supports SRS parameter determination techniques in accordance with aspects of the present disclosure. In some examples, wireless communications system 200 may implement aspects of wireless communications system 100. In this example, wireless communications system 200 includes UE 115-a and base station 105-a, which may be respective examples of a UE 115 and a base station 105 as described herein. UE 115-a and base station 105-a may communicate via a communication link 205. The communication link 205 may be configured for uplink and downlink transmissions.

In some examples, base station 105-a may allocate one or more resource blocks to the UE 115-a from a system bandwidth for an uplink or downlink transmission. The system bandwidth may be divided into a set of resource blocks that may be allocated for uplink and/or downlink transmission. Base station 105-a may determine a resource block allocation 210 for UE 115-a, and may configure resources for SRS transmissions. For example, in some NR deployments, SRS resources may span 1, 2, or 4 adjacent symbols with up to 4 antenna ports per SRS resource. All ports of an SRS resource may be sounded in each symbol. SRS resources may be configured for aperiodic (DCI-signaled) SRS transmissions, semi-persistent SRS transmissions, or periodic SRS transmissions. Further, SRS transmissions may be wideband or subband transmissions within resource block allocation 210, and in some cases SRS bandwidth may be multiples of four PRBs.

In some cases, the base station 105-a may configure multiple SRS resource sets that may be associated with different use cases for the SRS. Such use cases may be indicated by a usage parameter, and may include, for example, uplink codebook SRS, uplink non-codebook SRS for determining precoding, analog beamforming SRS, and antenna switching SRS. Each group of SRS resources with a specific use case may be referred to as a SRS resource set. In some cases, each SRS resource set may have a resource type parameter that indicates whether the resource type is periodic, semi-persistent, or aperiodic. Each SRS resource set may also include power control parameters, which may provide a pathloss reference signal (e.g., pathlossReferenceRS), an initial power (e.g., p0), and a power control adjustment (e.g., srs-PowerControlAdjustmentStates), which may be used to determine SRS transmission power.

Each SRS resource set may have transmission resource parameters, that may indicate a symbol in a slot, slot-index, and periodicity in cases of periodic or semi-persistent resource types.

In some cases, two or more of the SRS resource sets configured at a UE may be mapped to a same SRS transmission resource (e.g., a same antenna port during an orthogonal frequency division multiplexing (OFDM) symbol that is allocated for SRS transmission). In the example of FIG. 2, a first SRS resource set and a second SRS resource set may be mapped to a first SRS resource 215, and a third SRS resource set may be mapped to a second SRS resource 220. Further, one or more parameters of the first SRS resource set and the second SRS resource set may be different (e.g., different SRS resource sets may have different precoding or antenna virtualization). Data transmissions 225 may be allocated to other resources of resource block allocation 210, in this example.

In some cases, a prioritization is used to determine which of the first SRS resource set of the second SRS resource set is to be used for the first SRS resource 215. Such a prioritization may be based on, for example, a use case associated with each SRS resource set, a SRS resource set identification (e.g., based on high-to-low or low-to-high identification values), a specified prioritization, a configured prioritization (e.g., configured via radio resource control (RRC) signaling), a randomized prioritization, a round-robin prioritization, or combinations thereof. In some cases, the UE 115-a may apply SRS parameters of both the first SRS resource set and the second SRS resource set to the first SRS resource 215 based at least in part on one or more allowed combinations of SRS use cases that may use a same SRS transmission resource. For example, a first combination of SRS resource sets for uplink codebook and antenna switching use cases may be allowed to use a same SRS transmission resource, and a second combination of SRS resource sets for non-codebook precoding and antenna switching use cases may not be allowed to use a same SRS transmission resource. Such allowable combinations may be determined, in some cases, based at least in part on a usage parameter that indicates the use case of the SRS resource sets. In some cases, one or more use case combinations of SRS resource sets that may use a same SRS transmission resource may be allowed based on UE 115-a capability.

In some cases, prioritization of SRS resource sets may be based on a number of antenna ports associated with the SRS resource sets. For example, if both the first SRS resource set and the second SRS resource set have a single antenna port resource, the UE 115-a may transmit a joint SRS using first SRS resource 215 for both SRS resource sets. However, if one of the first or second SRS resource sets has two or more antenna ports, the UE may prioritize between the SRS resource sets. In some cases, the SRS resource sets may be configured as periodic SRS resource sets. In such cases, if the first SRS resource set and the second SRS resource set have a same periodicity the UE 115-a may transmit via the first SRS resource 215 according to both of the first and second SRS resource sets.

In some cases, as discussed herein, the base station 105-a may use RRC signaling to indicate to the UE 115-a prioritizations or allowed combinations of SRS resource sets that the UE 115-a may use for determining SRS parameters. In other cases, such prioritizations or allowed combinations of SRS resource sets may be specified in a wireless communications standard.

Figure 3:
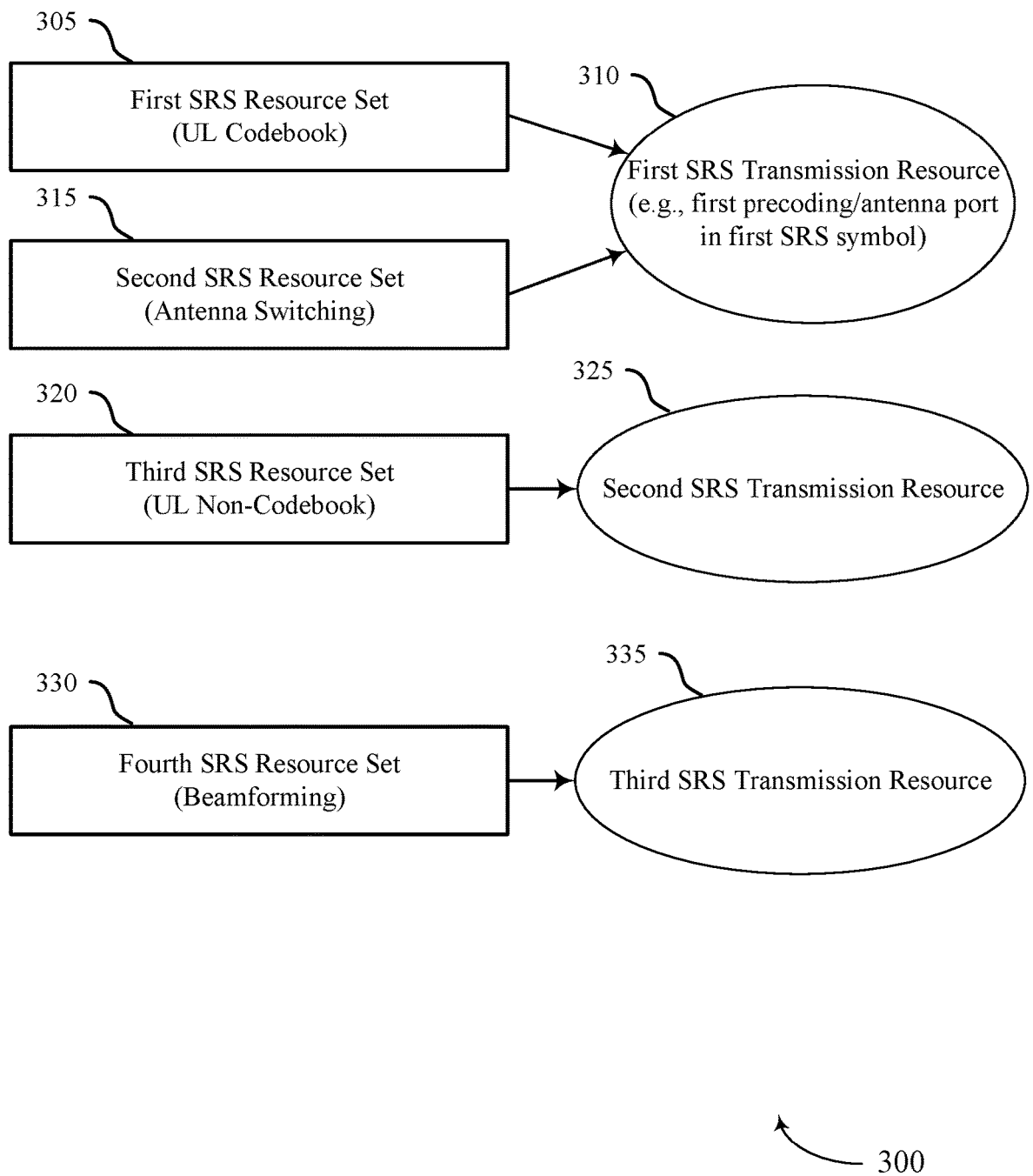
FIG. 3 illustrates an example of SRS resource sets and associated SRS resources that support SRS parameter determination techniques in accordance with aspects of the present disclosure.

FIG. 3 illustrates an example of SRS resource sets and associated SRS resources 300 that support SRS parameter determination techniques in accordance with aspects of the present disclosure. In some examples, SRS resource sets and associated SRS resources 300 may implement aspects of wireless communications system 100 or 200. As discussed herein, different SRS resource sets may be mapped to the same or different SRS resources.

In this example, a first SRS resource set 305 may be associated with uplink codebook SRS transmissions that a base station may use to evaluate codebook-based transmissions. A second SRS resource set 315 may be associated with antenna switching, which may be used to determine downlink precoding to be applied to channel state information reference signal (CSI-RS) transmissions. In this example, the first SRS resource set 305 and the second SRS resource set 315 may each include a first SRS transmission resource 310. Further, a third SRS resource set 320 may be associated with uplink non-codebook transmissions which may be used to determine precoding for non-codebook transmissions, and the third SRS resource set 320 may be mapped to a second SRS transmission resource 325. A fourth SRS resource set 330 may be associated with a beamforming use case and may be used to evaluate beamforming parameters for use in beam management, and the fourth SRS resource set 330 may be mapped to a third SRS transmission resource 335. It is noted that the example of FIG. 3 is provided for purposes of discussion and illustration only, and different SRS resource sets may be associated with the same or different SRS transmission resources.

In cases where two or more SRS resource sets have a same SRS transmission resource (e.g., configured through LPP), such as first SRS resource set 305 and second SRS resource set 315 that have first SRS transmission resource 310 (e.g., a first precoding or antenna port in a first SRS symbol), techniques provided herein allow for the UE to determine parameters to use for the SRS transmission using the first SRS transmission resource 310. In some cases, the UE may determine SRS parameters based on a prioritization of the use-cases associated with the SRS resource sets. Such a prioritization may be a fixed prioritization that is based on a SRS resource set ID, for example. In such cases, when the first SRS transmission resource 310 is associated with multiple SRS resource sets, the ports of the first SRS transmission resource 310 may be precoded such that the UE uses parameters of the smallest SRS resource set ID (or largest SRS resource set ID), a configured SRS resource set ID (e.g., a SRS resource set ID indicated in RRC signaling), or a specified prioritization. Such a specified prioritization may be, for example, an ordering of use cases such as codebook, then non-codebook, then antenna switching, then beamforming. In some cases, the prioritization may be fixed according to a specification. In other cases, the prioritization may be configurable (e.g., via RRC signaling, a system information transmission (e.g., SSB, RMSI, etc.), UE-specific signaling, or high layer signaling (e.g., LPP)).

In other cases, prioritization of the SRS resource sets may be a randomized prioritization. In some examples, for periodic or semi-persistent SRS resource sets, which contain periodic SRS resources, the UE may transmit the SRS ports according to the use case of the SRS resource set ID with a round robin fashion across all SRS resource sets. In such cases, the SRS resource set may be alternated and thus provide SRS for each use case in a periodic manner. In some cases, the UE may be capable of providing a SRS transmission based on multiple SRS resource sets. In such cases, one or more combinations of use cases may be configured that are available for transmission using one SRS transmission resource. For example, first SRS resource set 305 for codebook uplink transmissions and second SRS resource set 315 for antenna switching may be an allowed combination that can be transmitted using the first SRS transmission resource 310. Other combinations of use cases may be permitted or not permitted. For example, a non-codebook uplink and antenna switching use case combination may not be allowed.

Further, if the first SRS transmission resource 310 is a single antenna port resource, then the UE may transmit according to both use-cases of the first SRS resource set 305 and second SRS resource set 315, but if the first SRS transmission resource 310 has 2 or more ports, the UE may prioritize between the two use-cases. Additionally or alternatively, depending on periodicity of SRS resource sets, different solutions may be selected. For example, for two periodic SRS resource sets the UE may transmit the joint SRS resources according to both use-cases, but for two aperiodic SRS resource sets the UE can select which use case to prioritize. In some cases, if the periodicity of the two periodic SRS resource sets is less than a threshold value, alternating SRS transmissions may use different SRS resource sets, but if the periodicity meets or exceeds the threshold value the UE may transmit the joint SRS resources according to both use-cases.

Figure 4:
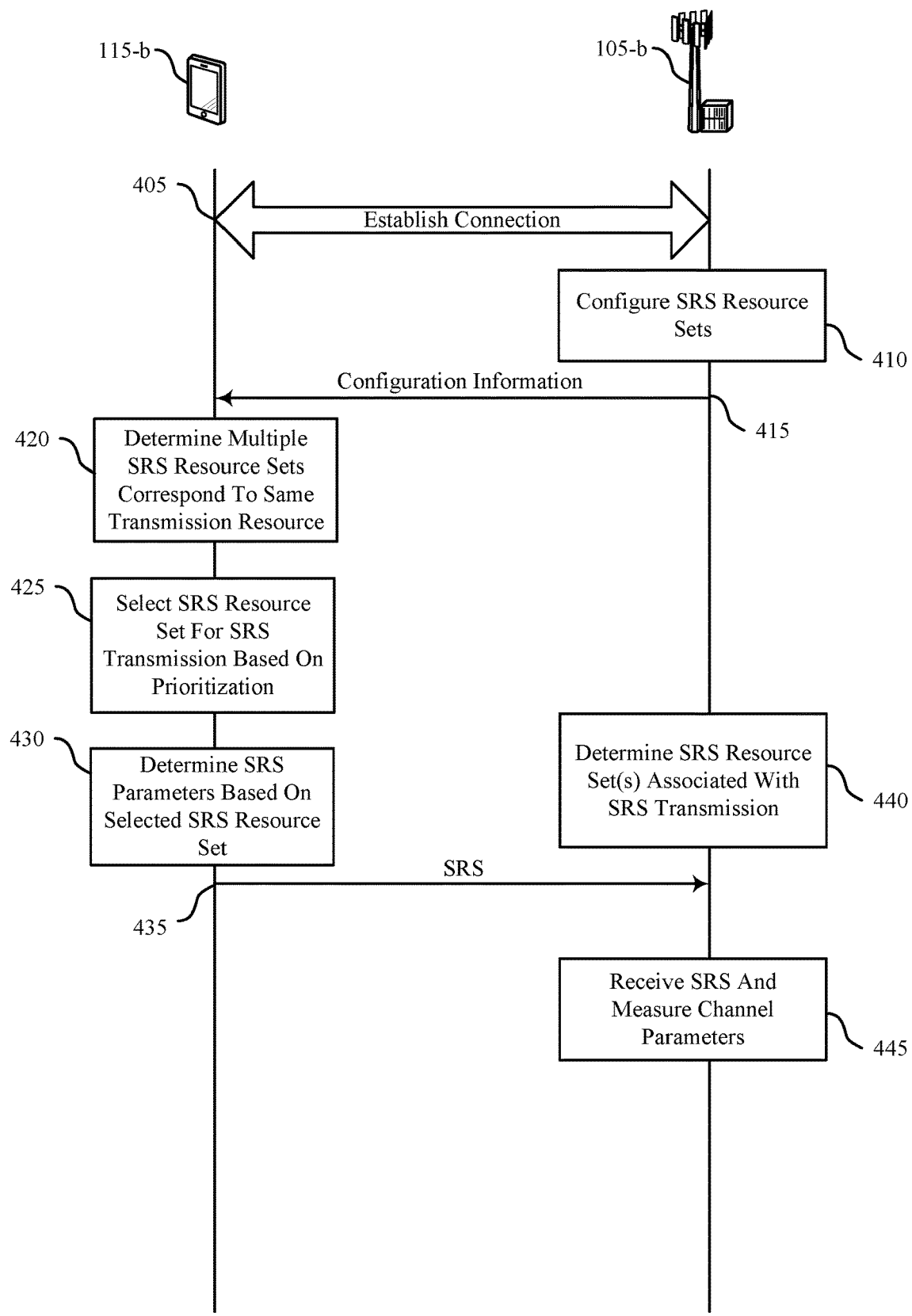
FIG. 4 illustrates an example of a process flow that supports SRS parameter determination techniques in accordance with aspects of the present disclosure.

FIG. 4 illustrates an example of a process flow 400 that supports SRS parameter determination techniques in accordance with aspects of the present disclosure. In some examples, process flow 400 may implement aspects of wireless communications system 100 or 200. Process flow 400 may include UE 115-b and base station 105-b, which may be respective examples of a UE 115 and a base station 105 as described herein.

At 405, UE 115-b and base station 105-b may perform a connection establishment to establish communications. In some cases, during connection establishment (e.g., RRC connection establishment or RRC connection reconfiguration), or after connection establishment, base station 105-b configure two or more SRS resource sets, as indicated at 410. Base station 105-b may transmit configuration information 415 that may indicate the SRS resource sets. In some cases, the configuration information may be transmitted as part of the connection establishment at 405. In some cases, the configuration information may include an indication of a priority to be applied by the UE 115-b in the event that two or more SRS resource sets use a same SRS transmission resource (e.g., configured through LPP). In some cases, the configuration information may include an indication of one or more combinations of SRS resource sets that may use a same SRS transmission resource (e.g., defined in RRC or defined in LPP). In some cases, as part of the connection establishment, the UE 115-b may provide the base station 105-b with an indication of the capability of the UE 115-b, and the base station 105-b may determine the configuration based at least in part on the UE 115-b capability.

At 420, UE 115-b may determine that multiple SRS resource sets correspond to a same SRS transmission resource. Such a determination may be made based on one or more parameters of the SRS resource sets that correspond to a same SRS transmission resource. At 425, the UE 115-b may select a SRS resource set for an SRS transmission based on a prioritization that applies in such cases. The prioritization may be based on resource set identification, a prioritization of use cases associated with the SRS resource sets, or may be configured by the base station 105-b. At 430, the UE 115-b may determine SRS parameters based on selected SRS resource set. The UE 115-b may transmit SRS 435 to the base station 105-b.

The base station 105-b, at 440, may determine SRS resource set(s) associated with SRS 435 transmission. In some cases, the base station 105-b may determine the use case that the UE 115-b will select. In some cases, the use case may be determined based on a prioritization that is specified or that is provided by the base station 105-b in the configuration information. At 445, the base station 105-b may receive the SRS 435 and measure channel parameters. Based on the measured channel parameters, and the identified use case that the UE 115-b used for the SRS transmission, the base station 105-b may determine one or more parameters for subsequent communications with the UE 115-b.

Figure 5:
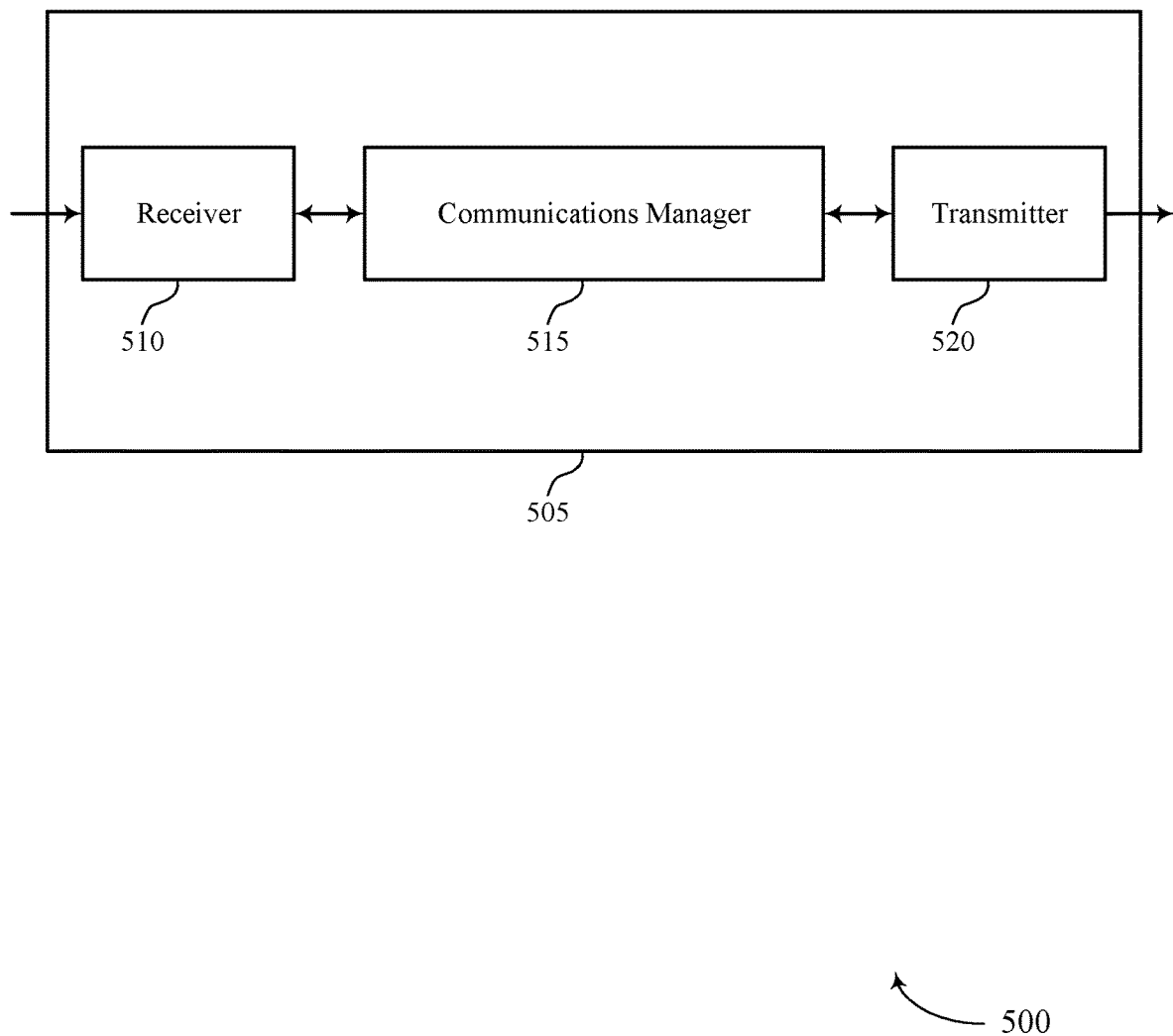
FIGS. 5 and 6 show block diagrams of devices that support SRS parameter determination techniques in accordance with aspects of the present disclosure.

FIG. 5 shows a block diagram 500 of a device 505 that supports SRS parameter determination techniques in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to SRS parameter determination techniques, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive configuration information for at least a first SRS resource set and a second SRS resource set, the first SRS resource set and the second SRS resource set each including two or more parameters for an associated SRS transmission, determine that the first SRS resource set and the second SRS resource set correspond to a same transmission resource, select the first SRS resource set for a first SRS communication using the transmission resource based on a prioritization associated with each of the first SRS resource set and the second SRS resource set, and transmit the first SRS communication based on one or more SRS transmission parameters associated with the first SRS resource set. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be com-bined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to receive configuration information for a first and second SRS resource set and select between the SRS resource sets based at least in part on a prioritization. This selection may allow for the first and second SRS resource sets to share a transmission resource which may increase reliability and reduce latency.

Based on techniques for prioritizing SRS resource sets as described herein, a processor of a UE 115 (e.g., controlling the receiver 510, the transmitter 520, or the transceiver 820 as described with reference to FIG. 8) may increase reliability and decrease signaling overhead in the communications.

Figure 6:
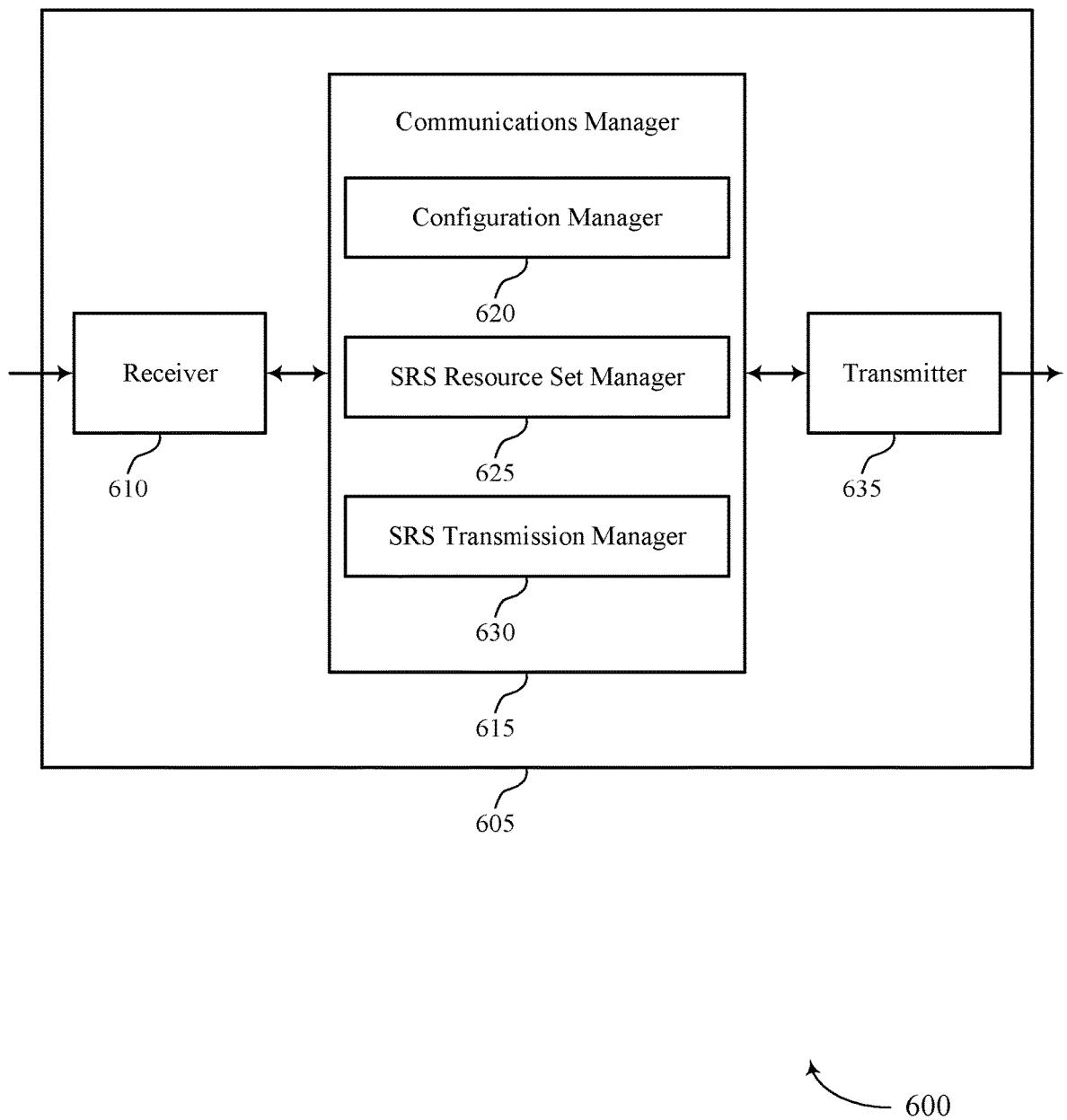

FIG. 6 shows a block diagram 600 of a device 605 that supports SRS parameter determination techniques in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to SRS parameter determination techniques, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a SRS resource set manager 625, and a SRS transmission manager 630. The communications manager 615 may be an example of aspects of the communications manager 810 described herein.

The configuration manager 620 may receive configuration information for at least a first SRS resource set and a second SRS resource set, the first SRS resource set and the second SRS resource set each including two or more parameters for an associated SRS transmission.

The SRS resource set manager 625 may determine that the first SRS resource set and the second SRS resource set correspond to a same transmission resource and select the first SRS resource set for a first SRS communication using the transmission resource based on a prioritization associated with each of the first SRS resource set and the second SRS resource set.

The SRS transmission manager 630 may transmit the first SRS communication based on one or more SRS transmission parameters associated with the first SRS resource set.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some examples, the communications manager 615 may be implemented as an integrated circuit or chipset for a mobile device modem, and the receiver 610 and transmitter 635 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to receive configuration information for a first and second SRS resource set and select between the SRS resource sets based at least in part on a prioritization. This selection may allow for the first and second SRS resource sets to share a transmission resource which may increase reliability and reduce latency.

Based on techniques for prioritizing SRS resource sets as described herein, a processor of a UE 115 (e.g., controlling the receiver 610, the transmitter 635, or the transceiver 820 as described with reference to FIG. 8) may increase reliability and decrease signaling overhead in the communications.

Figure 7:
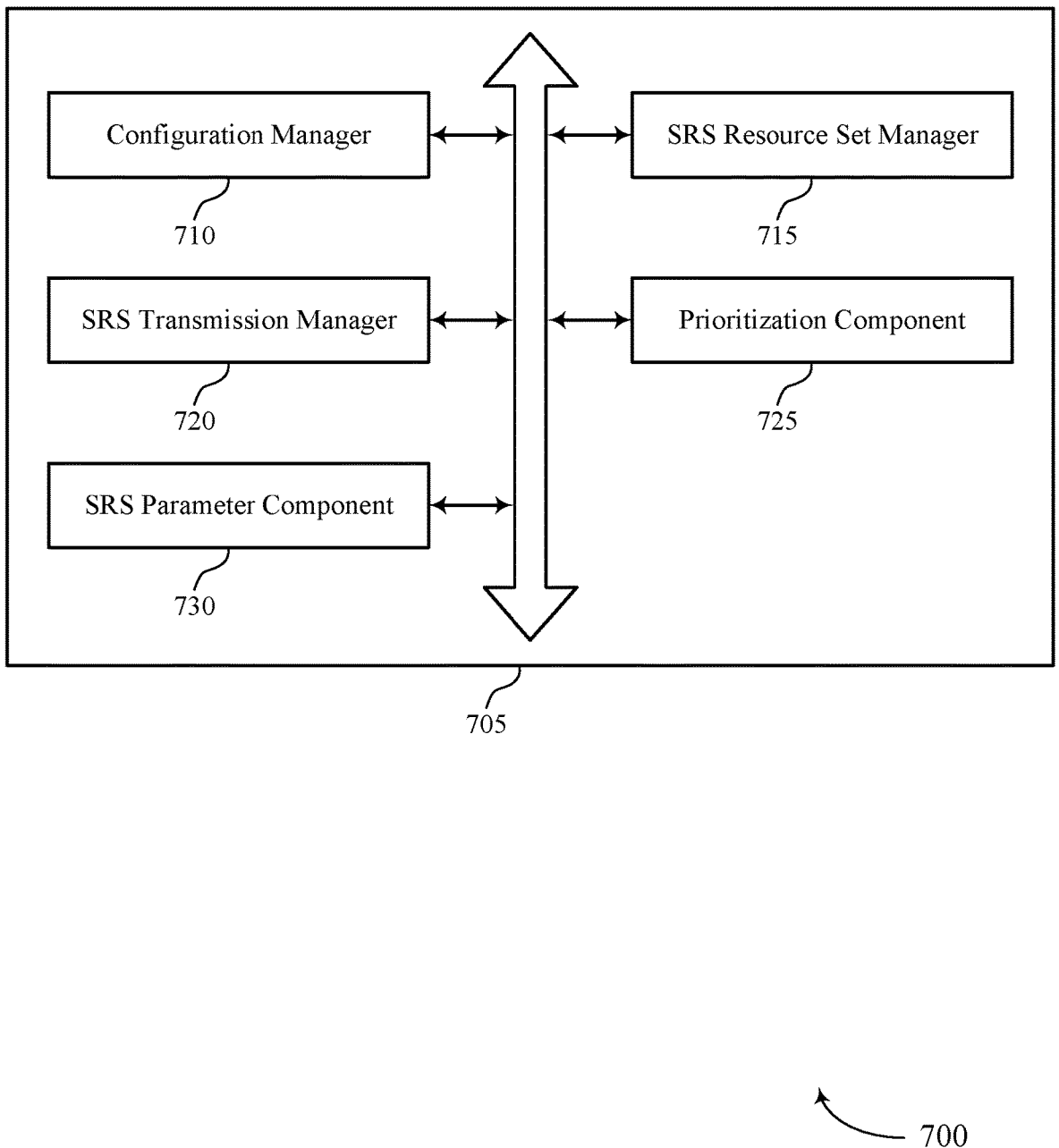
FIG. 7 shows a block diagram of a communications manager that supports SRS parameter determination techniques in accordance with aspects of the present disclosure.

FIG. 7 shows a block diagram 700 of a communications manager 705 that supports SRS parameter determination techniques in accordance with aspects of the present disclosure. The communications manager 705 may be an example of aspects of a communications manager 515, a communications manager 615, or a communications manager 810 described herein. The communications manager 705 may include a configuration manager 710, a SRS resource set manager 715, a SRS transmission manager 720, a prioritization component 725, and a SRS parameter component 730. Each of these modules may communicate, directly or indirectly, with one another (e.g., via one or more buses).

The configuration manager 710 may receive configuration information for at least a first SRS resource set and a second SRS resource set, the first SRS resource set and the second SRS resource set each including two or more parameters for an associated SRS transmission. In some cases, the configuration information further indicates a priority associated with each SRS resource set.

The SRS resource set manager 715 may determine that the first SRS resource set and the second SRS resource set correspond to a same transmission resource. In some examples, the SRS resource set manager 715 may select the first SRS resource set for a first SRS communication using the transmission resource based on a prioritization associated with each of the first SRS resource set and the second SRS resource set. In some examples, the SRS resource set manager 715 may determine that the first SRS resource set and the second SRS resource set are associated with parameters that can be satisfied in a same SRS transmission, and the first SRS communication may be transmitted based on one or more SRS transmission parameters associated with both the first SRS resource set and the second SRS resource set. In some cases, the prioritization includes one or more combinations of SRS usage parameters that indicate that a same SRS transmission may be used for both the first SRS resource set and the second SRS resource set.

In some examples, the SRS resource set manager 715 may determine that the first SRS resource set and the second SRS resource set are each associated with a single antenna port, and the first SRS communication may be transmitted based on one or more SRS transmission parameters associated with both the first SRS resource set and the second SRS resource set. In some examples, the SRS resource set manager 715 may determine that the first SRS resource set and the second SRS resource set each have a same periodicity, and the first SRS communication may be transmitted based on one or more SRS transmission parameters associated with both the first SRS resource set and the second SRS resource set.

The SRS transmission manager 720 may transmit the first SRS communication based on one or more SRS transmission parameters associated with the first SRS resource set. In some examples, the SRS transmission manager 720 may precode one or more antenna ports of the first SRS communication based on the one or more SRS transmission parameters associated with the first SRS resource set.

The prioritization component 725 may determine prioritization associated with the one or more SRS resource sets. In some cases, the prioritization is based on one or more of a resource set identification value of each of the first SRS resource set and the second SRS resource set, a configured resource set identification priority; or a priority based on a usage parameter of each of the first SRS resource set and the second SRS resource set. In some cases, the prioritization is a random prioritization. In some cases, the prioritization provides for alternating between the first SRS resource set and the second SRS resource set in consecutive SRS transmissions that are associated with both the first SRS resource set and the second SRS resource set.

The SRS parameter component 730 may determine SRS parameters associated with SRS resource sets. In some cases, the two or more parameters of each SRS resource set include one or more of a resource type associated with the SRS resource set or power control parameters associated with the SRS resource set. In some cases, the resource type indicates a periodic SRS configuration, a semi-persistent SRS configuration, or an aperiodic SRS configuration. In some cases, the power control parameters indicate one or more of a pathloss reference signal, an initial transmission power for the associated SRS transmissions, or a power control adjustment state for the associated SRS transmissions. In some cases, the transmission resource is determined based on a symbol identification within a transmission slot and a transmission slot index and periodicity for semi-persistent or periodic SRS transmissions, or a trigger that initiates an aperiodic SRS transmission. In some cases, the first SRS resource set and the second SRS resource set are associated with a SRS use case, and include an associated usage parameter that indicates an uplink codebook-based channel quality determination, an uplink non-codebook precoding determination; an uplink analog beamforming determination, or an antenna switching procedure at the UE.

Figure 8:
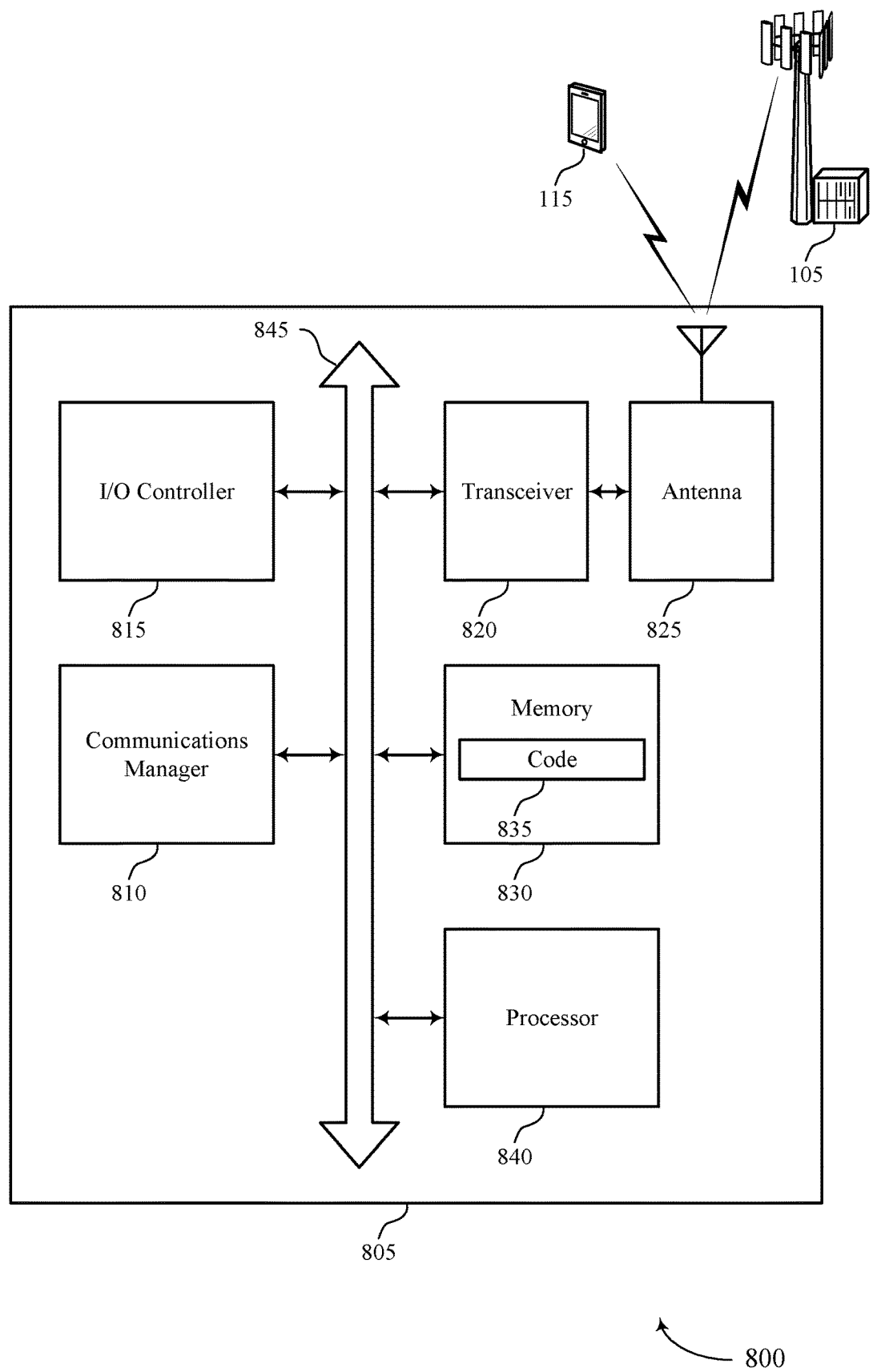
FIG. 8 shows a diagram of a system including a device that supports SRS parameter determination techniques in accordance with aspects of the present disclosure.

FIG. 8 shows a diagram of a system 800 including a device 805 that supports SRS parameter determination techniques in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive configuration information for at least a first SRS resource set and a second SRS resource set, the first SRS resource set and the second SRS resource set each including two or more parameters for an associated SRS transmission, determine that the first SRS resource set and the second SRS resource set correspond to a same transmission resource, select the first SRS resource set for a first SRS communication using the transmission resource based on a prioritization associated with each of the first SRS resource set and the second SRS resource set, and transmit the first SRS communication based on one or more SRS transmission parameters associated with the first SRS resource set.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting SRS parameter determination techniques).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
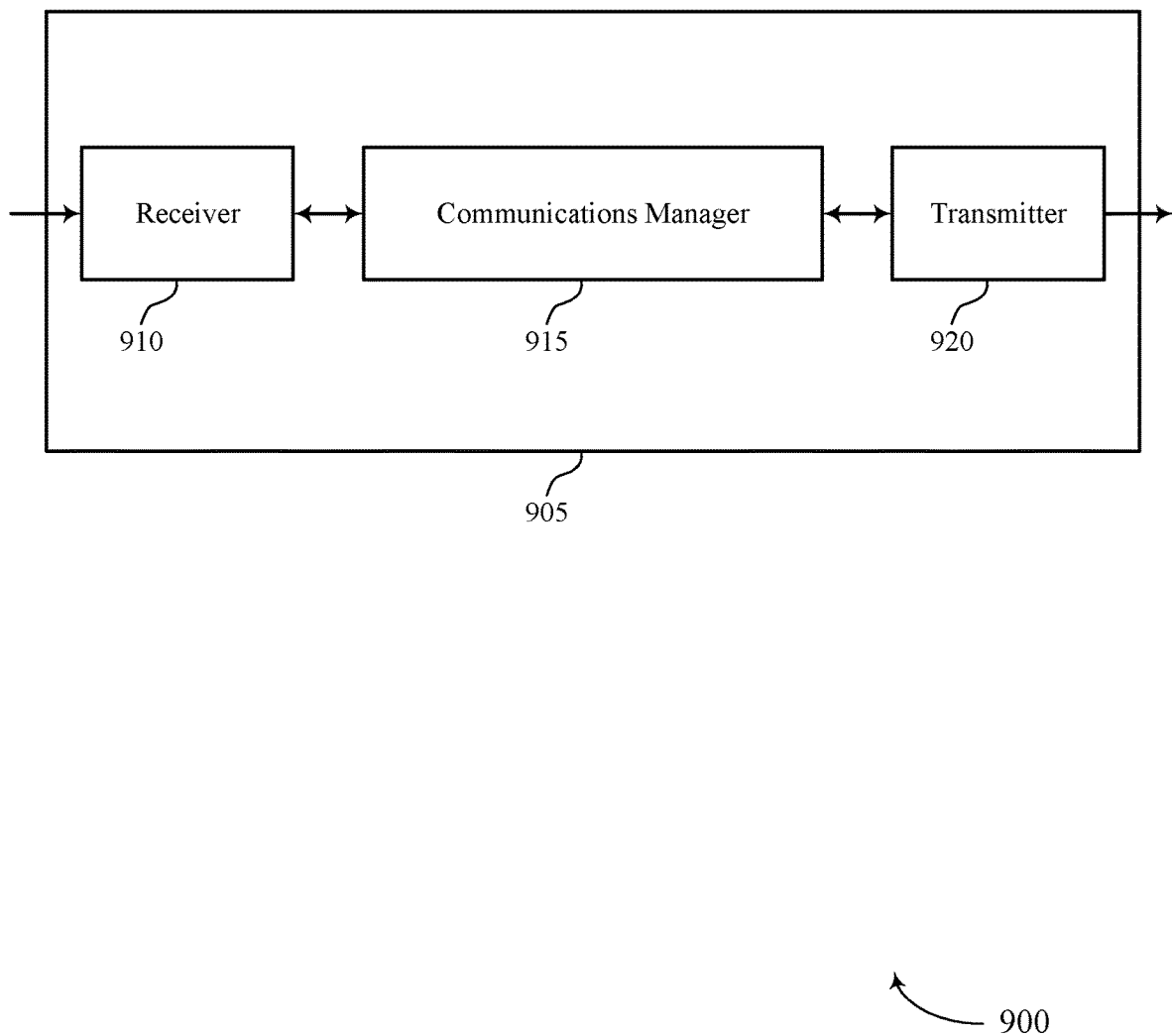
FIGS. 9 and 10 show block diagrams of devices that support SRS parameter determination techniques in accordance with aspects of the present disclosure.

FIG. 9 shows a block diagram 900 of a device 905 that supports SRS parameter determination techniques in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to SRS parameter determination techniques, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit configuration information to a UE for at least a first SRS resource set and a second SRS resource set, the first SRS resource set and the second SRS resource set each including two or more parameters for an associated SRS transmission, identify that the first SRS resource set and the second SRS resource set correspond to a same transmission resource, determine that the first SRS resource set is associated with the transmission resource based on a prioritization associated with each of the first SRS resource set and the second SRS resource set, and measure one or more channel characteristics of a SRS transmission received from the UE on the transmission resource based on one or more SRS transmission parameters associated with the first SRS resource set. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
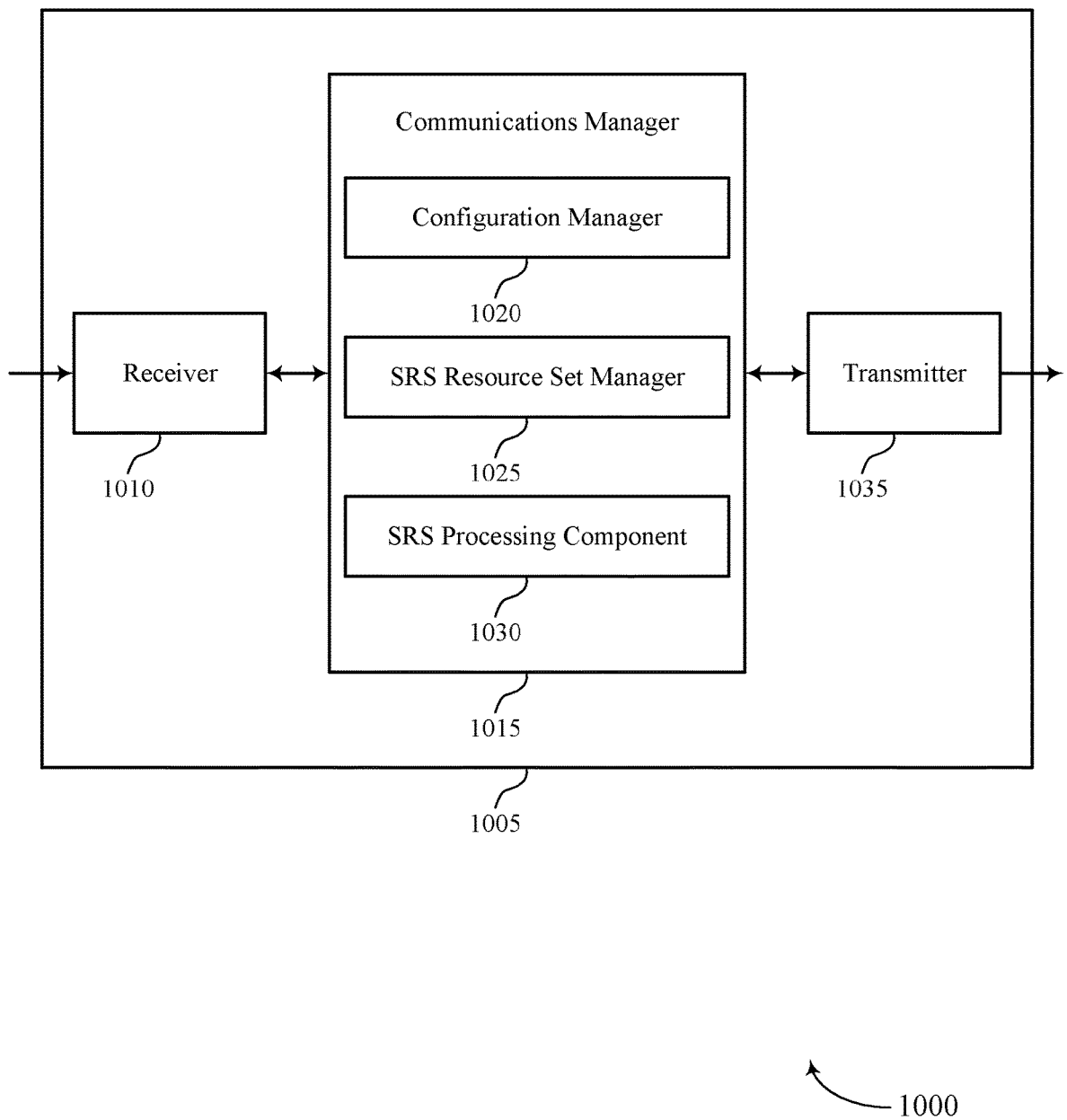

FIG. 10 shows a block diagram 1000 of a device 1005 that supports SRS parameter determination techniques in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to SRS parameter determination techniques, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a SRS resource set manager 1025, and a SRS processing component 1030. The communications manager 1015 may be an example of aspects of the communications manager 1210 described herein.

The configuration manager 1020 may transmit configuration information to a UE for at least a first SRS resource set and a second SRS resource set, the first SRS resource set and the second SRS resource set each including two or more parameters for an associated SRS transmission.

The SRS resource set manager 1025 may identify that the first SRS resource set and the second SRS resource set correspond to a same transmission resource and determine that the first SRS resource set is associated with the transmission resource based on a prioritization associated with each of the first SRS resource set and the second SRS resource set.

The SRS processing component 1030 may measure one or more channel characteristics of a SRS transmission received from the UE on the transmission resource based on one or more SRS transmission parameters associated with the first SRS resource set.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
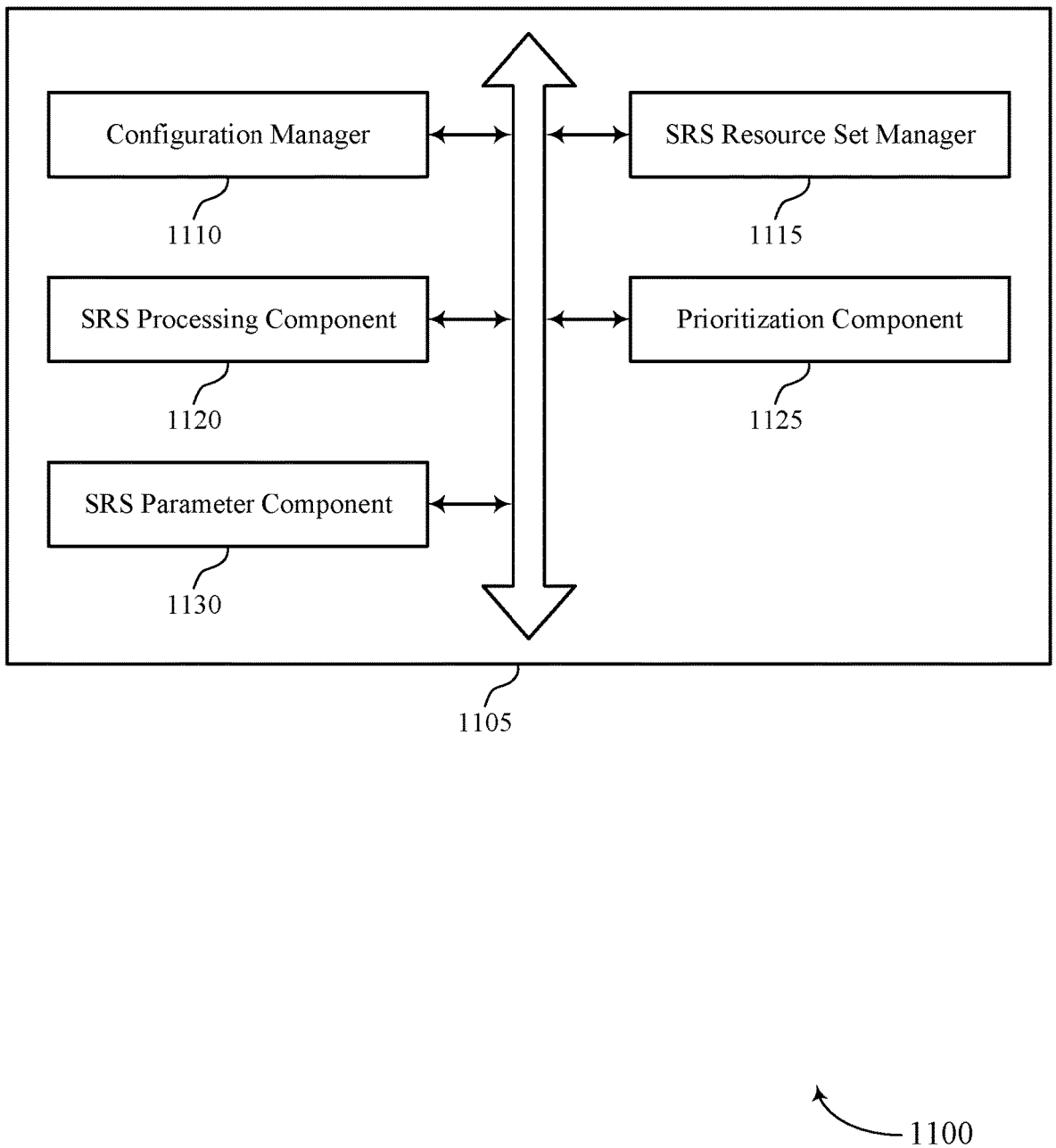
FIG. 11 shows a block diagram of a communications manager that supports SRS parameter determination techniques in accordance with aspects of the present disclosure.

FIG. 11 shows a block diagram 1100 of a communications manager 1105 that supports SRS parameter determination techniques in accordance with aspects of the present disclosure. The communications manager 1105 may be an example of aspects of a communications manager 915, a communications manager 1015, or a communications manager 1210 described herein. The communications manager 1105 may include a configuration manager 1110, a SRS resource set manager 1115, a SRS processing component 1120, a prioritization component 1125, and a SRS parameter component 1130. Each of these modules may communicate, directly or indirectly, with one another (e.g., via one or more buses).

The configuration manager 1110 may transmit configuration information to a UE for at least a first SRS resource set and a second SRS resource set, the first SRS resource set and the second SRS resource set each including two or more parameters for an associated SRS transmission. In some cases, the configuration information further includes one or more of a priority associated with each SRS resource set, or one or more combinations of parameters that indicate that a same SRS transmission may be used for both the first SRS resource set and the second SRS resource set.

The SRS resource set manager 1115 may identify that the first SRS resource set and the second SRS resource set correspond to a same transmission resource. In some examples, the SRS resource set manager 1115 may determine that the first SRS resource set is associated with the transmission resource based on a prioritization associated with each of the first SRS resource set and the second SRS resource set. In some examples, the SRS resource set manager 1115 may determine that the first SRS resource set and the second SRS resource set are each associated with a single antenna port, and where the SRS transmission is further measured based on one or more SRS transmission parameters associated with both the first SRS resource set and the second SRS resource set. In some examples, the SRS resource set manager 1115 may determine that the first SRS resource set and the second SRS resource set each have a same periodicity.

The SRS processing component 1120 may measure one or more channel characteristics of a SRS transmission received from the UE on the transmission resource based on one or more SRS transmission parameters associated with the first SRS resource set. In some examples, the SRS processing component 1120 may measure the SRS transmission further based on one or more SRS transmission parameters associated with both the first SRS resource set and the second SRS resource set.

The prioritization component 1125 may identify SRS resource set prioritization. In some cases, the prioritization is based on one or more of a resource set identification value of each of the first SRS resource set and the second SRS resource set, a configured resource set identification priority; or a priority based on a usage parameter of each of the first SRS resource set and the second SRS resource set. In some cases, the prioritization is a random prioritization. In some cases, the prioritization provides for alternating between the first SRS resource set and the second SRS resource set in consecutive SRS transmissions that are associated with both the first SRS resource set and the second SRS resource set.

The SRS parameter component 1130 may identify parameters for SRS resource sets. In some cases, the two or more parameters of each SRS resource set include one or more of a resource type associated with the SRS resource set or power control parameters associated with the SRS resource set. In some cases, the resource type indicates a periodic SRS configuration, a semi-persistent SRS configuration, or an aperiodic SRS configuration. In some cases, the power control parameters indicate one or more of a pathloss reference signal, an initial transmission power for the associated SRS transmissions, or a power control adjustment state for the associated SRS transmissions. In some cases, the transmission resource is determined based on a symbol identification within a transmission slot and a transmission slot index and periodicity for semi-persistent or periodic SRS transmissions, or a trigger that initiates an aperiodic SRS transmission. In some cases, the first SRS resource set and the second SRS resource set include an associated usage parameter that indicates an uplink codebook-based channel quality determination, an uplink non-codebook precoding determination; an uplink analog beamforming determination, or an antenna switching procedure at the UE.

Figure 12:
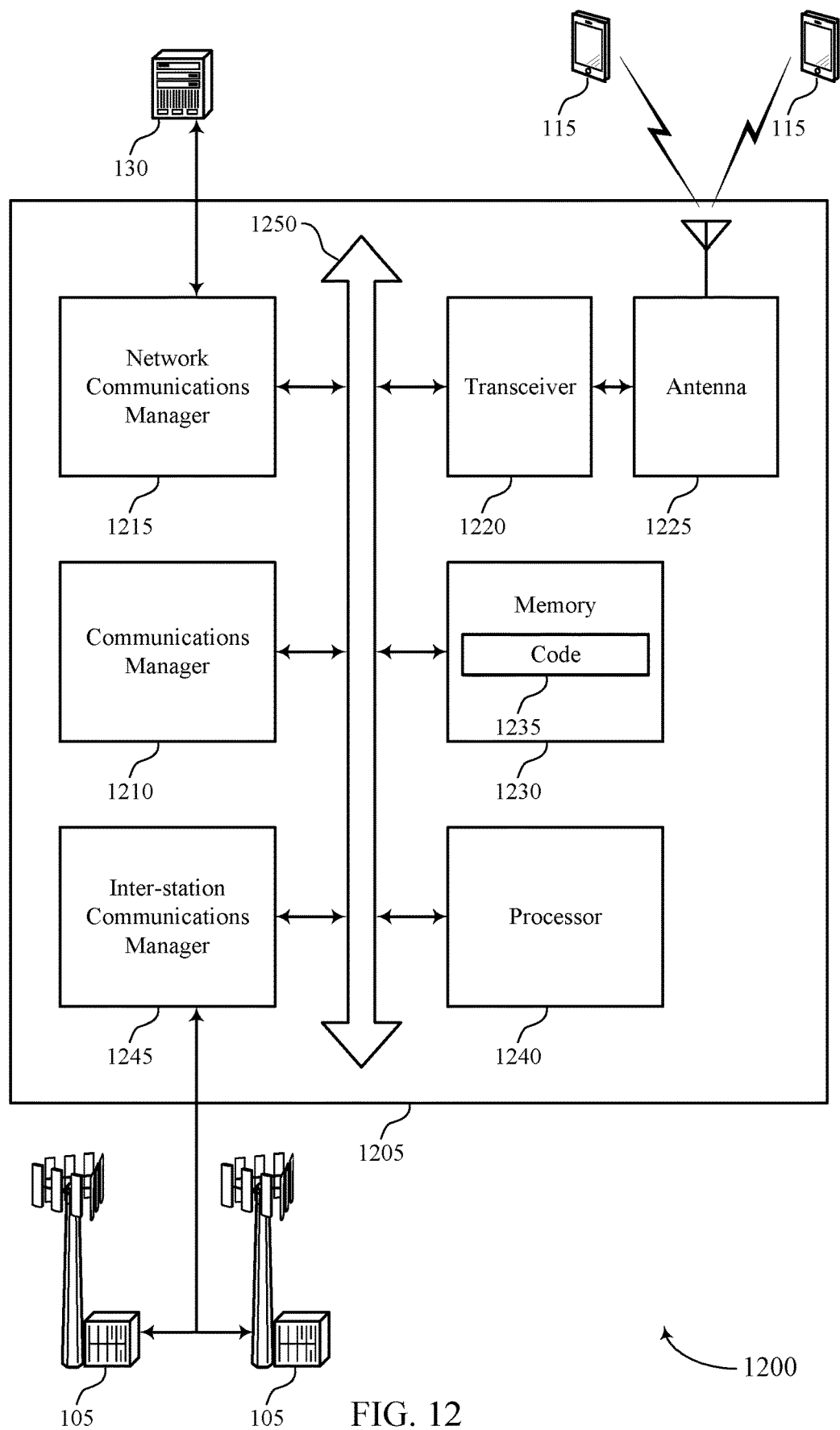
FIG. 12 shows a diagram of a system including a device that supports SRS parameter determination techniques in accordance with aspects of the present disclosure.

FIG. 12 shows a diagram of a system 1200 including a device 1205 that supports SRS parameter determination techniques in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit configuration information to a UE for at least a first SRS resource set and a second SRS resource set, the first SRS resource set and the second SRS resource set each including two or more parameters for an associated SRS transmission, identify that the first SRS resource set and the second SRS resource set correspond to a same transmission resource, determine that the first SRS resource set is associated with the transmission resource based on a prioritization associated with each of the first SRS resource set and the second SRS resource set, and measure one or more channel characteristics of a SRS transmission received from the UE on the transmission resource based on one or more SRS transmission parameters associated with the first SRS resource set.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting SRS parameter determination techniques).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
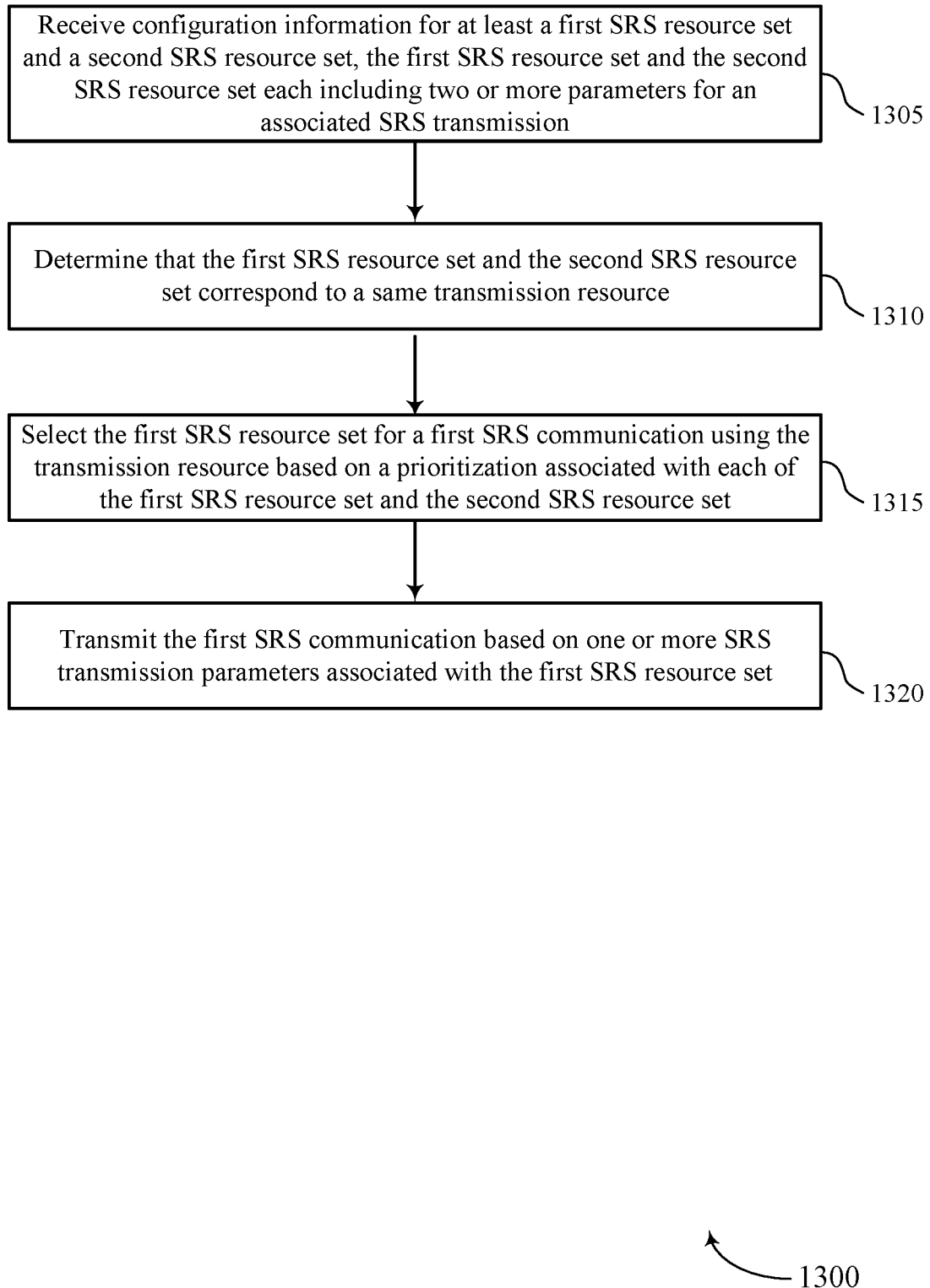
FIGS. 13 through 15 show flowcharts illustrating methods that support SRS parameter determination techniques in accordance with aspects of the present disclosure.

FIG. 13 shows a flowchart illustrating a method 1300 that supports SRS parameter determination techniques in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive configuration information for at least a first SRS resource set and a second SRS resource set, the first SRS resource set and the second SRS resource set each including two or more parameters for an associated SRS transmission. The operations of 1305 may be performed according to the methods described herein. In some examples, aspects of the operations of 1305 may be performed by a configuration manager as described with reference to FIGS. 5 through 8. In some cases, the two or more parameters of each SRS resource set include one or more of a resource type associated with the SRS resource set or power control parameters associated with the SRS resource set. In some cases, the resource type indicates a periodic SRS configuration, a semi-persistent SRS configuration, or an aperiodic SRS configuration. In some cases, the power control parameters indicate one or more of a pathloss reference signal, an initial transmission power for the associated SRS transmissions, or a power control adjustment state for the associated SRS transmissions. In some cases, the transmission resource is determined based on a symbol identification within a transmission slot and a transmission slot index and periodicity for semi-persistent or periodic SRS transmissions, or a trigger that initiates an aperiodic SRS transmission. In some cases, the first SRS resource set and the second SRS resource set include an associated usage parameter that indicates an uplink codebook-based channel quality determination, an uplink non-codebook precoding determination; an uplink analog beamforming determination, or an antenna switching procedure at the UE.

At 1310, the UE may determine that the first SRS resource set and the second SRS resource set correspond to a same transmission resource. The operations of 1310 may be performed according to the methods described herein. In some examples, aspects of the operations of 1310 may be performed by a SRS resource set manager as described with reference to FIGS. 5 through 8.

At 1315, the UE may select the first SRS resource set for a first SRS communication using the transmission resource based on a prioritization associated with each of the first SRS resource set and the second SRS resource set. The operations of 1315 may be performed according to the methods described herein. In some examples, aspects of the operations of 1315 may be performed by a SRS resource set manager as described with reference to FIGS. 5 through 8. In some cases, the prioritization is based on one or more of a resource set identification value of each of the first SRS resource set and the second SRS resource set, a configured resource set identification priority; or a priority based on a usage parameter of each of the first SRS resource set and the second SRS resource set. In some cases, the prioritization is a random prioritization. In some cases, the prioritization provides for alternating between the first SRS resource set and the second SRS resource set in consecutive SRS transmissions that are associated with both the first SRS resource set and the second SRS resource set.

At 1320, the UE may transmit the first SRS communication based on one or more SRS transmission parameters associated with the first SRS resource set. The operations of 1320 may be performed according to the methods described herein. In some examples, aspects of the operations of 1320 may be performed by a SRS transmission manager as described with reference to FIGS. 5 through 8.

Figure 14:
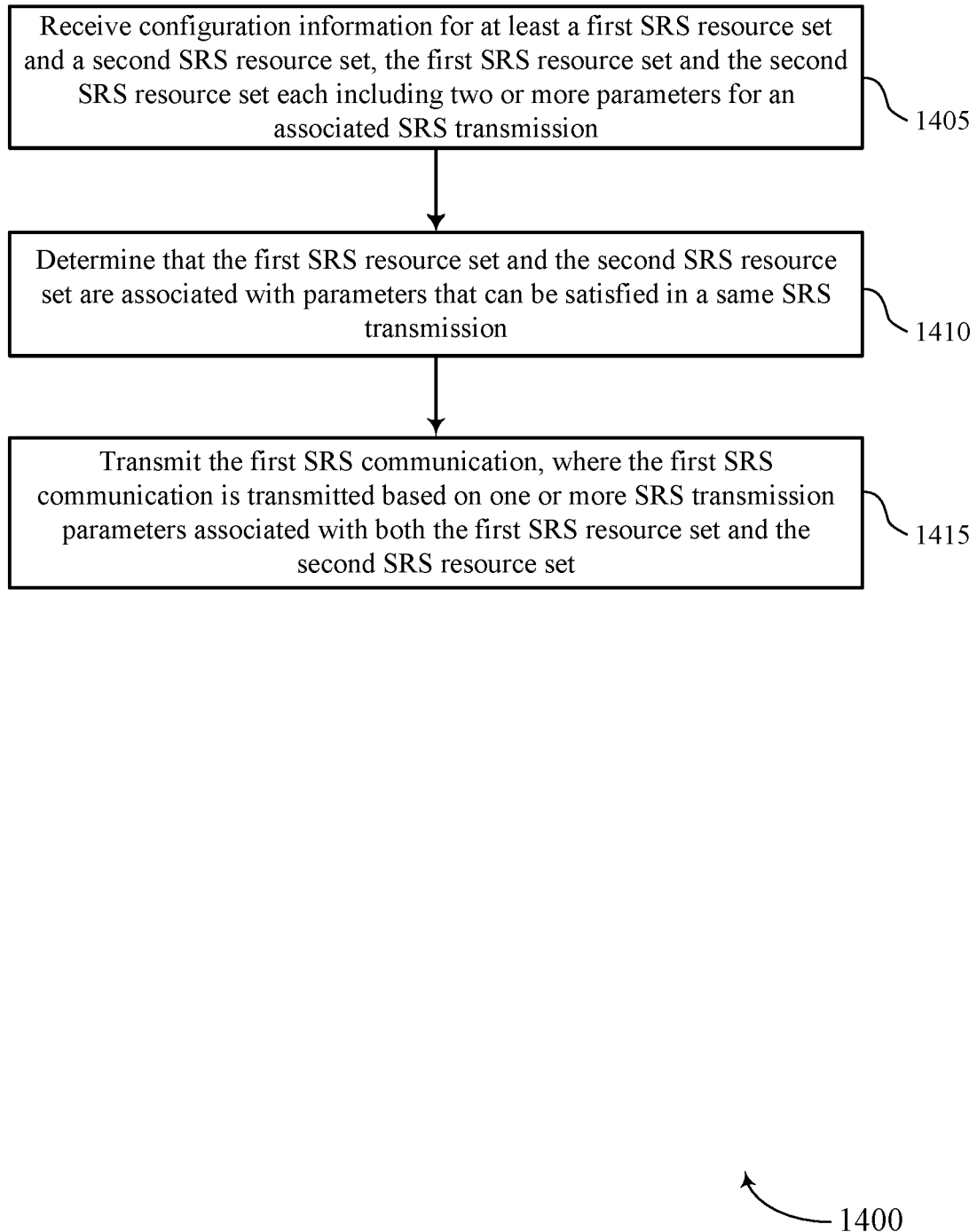

FIG. 14 shows a flowchart illustrating a method 1400 that supports SRS parameter determination techniques in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive configuration information for at least a first SRS resource set and a second SRS resource set, the first SRS resource set and the second SRS resource set each including two or more parameters for an associated SRS transmission. The operations of 1405 may be performed according to the methods described herein. In some examples, aspects of the operations of 1405 may be performed by a configuration manager as described with reference to FIGS. 5 through 8.

At 1410, the UE may determine that the first SRS resource set and the second SRS resource set are associated with parameters that can be satisfied in a same SRS transmission.

The operations of 1410 may be performed according to the methods described herein. In some examples, aspects of the operations of 1410 may be performed by a SRS resource set manager as described with reference to FIGS. 5 through 8. In some cases, the determination may be made based on the prioritization including one or more combinations of SRS usage parameters that indicate that a same SRS transmission may be used for both the first SRS resource set and the second SRS resource set.

At 1415, the UE may transmit the first SRS communication based on one or more SRS transmission parameters associated with the first SRS resource set. The operations of 1415 may be performed according to the methods described herein. In some examples, aspects of the operations of 1415 may be performed by a SRS transmission manager as described with reference to FIGS. 5 through 8.

Figure 15:
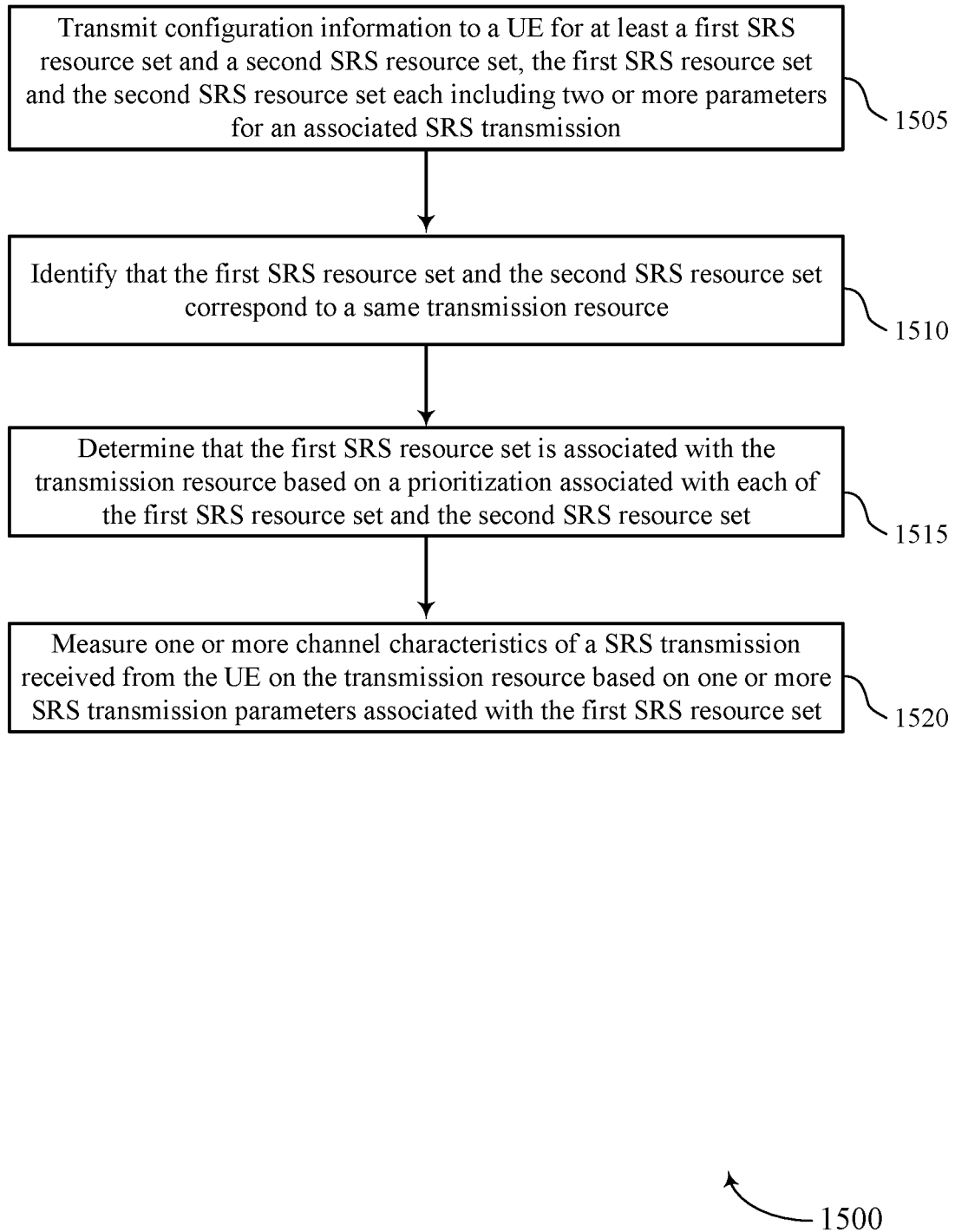

FIG. 15 shows a flowchart illustrating a method 1500 that supports SRS parameter determination techniques in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may transmit configuration information to a UE for at least a first SRS resource set and a second SRS resource set, the first SRS resource set and the second SRS resource set each including two or more parameters for an associated SRS transmission. The operations of 1505 may be performed according to the methods described herein. In some examples, aspects of the operations of 1505 may be performed by a configuration manager as described with reference to FIGS. 9 through 12. In some cases, the configuration information further includes one or more of a priority associated with each SRS resource set, or one or more combinations of parameters that indicate that a same SRS transmission may be used for both the first SRS resource set and the second SRS resource set.

At 1510, the base station may identify that the first SRS resource set and the second SRS resource set correspond to a same transmission resource. The operations of 1510 may be performed according to the methods described herein. In some examples, aspects of the operations of 1510 may be performed by a SRS resource set manager as described with reference to FIGS. 9 through 12.

At 1515, the base station may determine that the first SRS resource set is associated with the transmission resource based on a prioritization associated with each of the first SRS resource set and the second SRS resource set. The operations of 1515 may be performed according to the methods described herein. In some examples, aspects of the operations of 1515 may be performed by a SRS resource set manager as described with reference to FIGS. 9 through 12. In some cases, the prioritization is based on one or more of a resource set identification value of each of the first SRS resource set and the second SRS resource set, a configured resource set identification priority; or a priority based on a usage parameter of each of the first SRS resource set and the second SRS resource set. In some cases, the prioritization is a random prioritization and the determining is further based on the one or more measured channel characteristics. In some cases, the prioritization provides for alternating between the first SRS resource set and the second SRS resource set in consecutive SRS transmissions that are associated with both the first SRS resource set and the second SRS resource set.

At 1520, the base station may measure one or more channel characteristics of a SRS transmission received from the UE on the transmission resource based on one or more SRS transmission parameters associated with the first SRS resource set. The operations of 1520 may be performed according to the methods described herein. In some examples, aspects of the operations of 1520 may be performed by a SRS processing component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving configuration information for at least a first sounding reference signal (SRS) resource set and a second SRS resource set, the first SRS resource set and the second SRS resource set each including two or more parameters for an associated SRS transmission;

determining that the first SRS resource set and the second SRS resource set correspond to a same SRS transmission resource, wherein the SRS transmission resource comprises one or more antenna ports, used by an SRS transmission, in a collection of one or more time-frequency resources;

selecting the first SRS resource set for a first SRS communication using the SRS transmission resource based at least in part on a prioritization associated with each of the first SRS resource set and the second SRS resource set; and transmitting the first SRS communication based at least in part on one or more SRS transmission parameters associated with the first SRS resource set.

2. The method of claim 1, wherein the prioritization is based at least in part on one or more of a resource set identification value of each of the first SRS resource set and the second SRS resource set, a configured resource set identification priority; or a priority based on a usage parameter of each of the first SRS resource set and the second SRS resource set.

3. The method of claim 1, further comprising:
determining that the first SRS resource set and the second SRS resource set are associated with parameters that can be satisfied in a same SRS transmission, and wherein the first SRS communication is transmitted based at least in part on one or more SRS transmission parameters associated with both the first SRS resource set and the second SRS resource set.

4. The method of claim 3, wherein the prioritization includes one or more combinations of SRS usage parameters that indicate that a same SRS transmission may be used for both the first SRS resource set and the second SRS resource set.

5. The method of claim 1, wherein the configuration information further indicates a priority associated with each SRS resource set.

6. The method of claim 1, wherein the transmitting comprises:
precoding one or more antenna ports of the first SRS communication based at least in part on the one or more SRS transmission parameters associated with the first SRS resource set.

7. The method of claim 1, wherein the prioritization is a random prioritization.

8. The method of claim 1, wherein the prioritization provides for alternating between the first SRS resource set and the second SRS resource set in consecutive SRS transmissions that are associated with both the first SRS resource set and the second SRS resource set.

9. The method of claim 1, further comprising:
determining that the first SRS resource set and the second SRS resource set are each associated with a single antenna port, and wherein the first SRS communication is transmitted based at least in part on one or more SRS transmission parameters associated with both the first SRS resource set and the second SRS resource set.

10. The method of claim 1, further comprising:
determining that the first SRS resource set and the second SRS resource set each have a same periodicity; and
transmitting the first SRS communication further based at least in part on one or more SRS transmission param-eters associated with both the first SRS resource set and the second SRS resource set.

11. The method of claim 1, wherein the two or more parameters of each SRS resource set include one or more of a resource type associated with the SRS resource set or power control parameters associated with the SRS resource set.

12. The method of claim 11, wherein the resource type indicates a periodic SRS configuration, a semi-persistent SRS configuration, or an aperiodic SRS configuration.

13. The method of claim 11, wherein the power control parameters indicate one or more of a pathloss reference signal, an initial transmission power for the associated SRS transmissions, or a power control adjustment state for the associated SRS transmissions.

14. The method of claim 1, wherein the SRS transmission resource is determined based at least in part on a symbol identification within a transmission slot and a transmission slot index and periodicity for semi-persistent or periodic SRS transmissions, or a trigger that initiates an aperiodic SRS transmission.

15. The method of claim 1, wherein the first SRS resource set and the second SRS resource set include an associated usage parameter that indicates an uplink codebook-based channel quality determination, an uplink non-codebook pre-coding determination; an uplink analog beamforming determination, or an antenna switching procedure at the UE.

16. A method for wireless communication at a base station, comprising:
transmitting configuration information to a user equipment (UE) for at least a first sounding reference signal (SRS) resource set and a second SRS resource set, the first SRS resource set and the second SRS resource set each including two or more parameters for an associated SRS transmission;

identifying that the first SRS resource set and the second SRS resource set correspond to a same SRS transmission resource, wherein the SRS transmission resource comprises one or more antenna ports, used by an SRS transmission, in a collection of one or more time-frequency resources;

determining that the first SRS resource set is associated with the SRS transmission resource based at least in part on a prioritization associated with each of the first SRS resource set and the second SRS resource set; and measuring one or more channel characteristics of a SRS transmission received from the UE on the SRS transmission resource based at least in part on one or more SRS transmission parameters associated with the first SRS resource set.

17. The method of claim 16, wherein the prioritization is based at least in part on one or more of a resource set identification value of each of the first SRS resource set and the second SRS resource set, a configured resource set identification priority; or a priority based on a usage parameter of each of the first SRS resource set and the second SRS resource set.

18. The method of claim 16, wherein the prioritization is a random prioritization and the determining is further based on the one or more measured channel characteristics.

19. The method of claim 16, wherein the prioritization provides for alternating between the first SRS resource set and the second SRS resource set in consecutive SRS transmissions that are associated with both the first SRS resource set and the second SRS resource set.

20. The method of claim 16, wherein the configuration information further includes one or more of a priority associated with each SRS resource set, or one or more combinations of parameters that indicate that a same SRS transmission may be used for both the first SRS resource set and the second SRS resource set.

21. The method of claim 16, further comprising:
determining that the first SRS resource set and the second SRS resource set are each associated with a single antenna port, and wherein the SRS transmission is further measured based at least in part on one or more SRS transmission parameters associated with both the first SRS resource set and the second SRS resource set.

22. The method of claim 16, further comprising:
determining that the first SRS resource set and the second SRS resource set each have a same periodicity; and
measuring the SRS transmission further based at least in part on one or more SRS transmission parameters associated with both the first SRS resource set and the second SRS resource set.

23. The method of claim 16, wherein the two or more parameters of each SRS resource set include one or more of a resource type associated with the SRS resource set or power control parameters associated with the SRS resource set.

24. The method of claim 23, wherein the resource type indicates a periodic SRS configuration, a semi-persistent SRS configuration, or an aperiodic SRS configuration.

25. The method of claim 23, wherein the power control parameters indicate one or more of a pathloss reference signal, an initial transmission power for the associated SRS transmissions, or a power control adjustment state for the associated SRS transmissions.

26. The method of claim 16, wherein the transmission resource is determined based at least in part on a symbol identification within a transmission slot and a transmission slot index and periodicity for semi-persistent or periodic SRS transmissions, or a trigger that initiates an aperiodic SRS transmission.

27. The method of claim 16, wherein the first SRS resource set and the second SRS resource set include an associated usage parameter that indicates an uplink codebook-based channel quality determination, an uplink non-codebook precoding determination; an uplink analog beamforming determination, or an antenna switching procedure at the UE.

28. An apparatus for wireless communication at a user equipment (UE), comprising:
a processor,
memory coupled with the processor; and
instructions stored in the memory and executable by the processor to cause the apparatus to:
receive configuration information for at least a first sounding reference signal (SRS) resource set and a second SRS resource set, the first SRS resource set and the second SRS resource set each including two or more parameters for an associated SRS transmission;
determine that the first SRS resource set and the second SRS resource set correspond to a same SRS transmission resource, wherein the SRS transmission resource comprises one or more antenna ports, used by an SRS transmission, in a collection of one or more time-frequency resources;
select the first SRS resource set for a first SRS communication using the SRS transmission resource based at least in part on a prioritization associated with each of the first SRS resource set and the second SRS resource set; and
transmit the first SRS communication based at least in part on one or more SRS transmission parameters associated with the first SRS resource set.

29. The apparatus of claim 28, wherein the prioritization is based at least in part on one or more of a resource set identification value of each of the first SRS resource set and the second SRS resource set, a configured resource set identification priority; or a priority based on a usage parameter of each of the first SRS resource set and the second SRS resource set.

30. A non-transitory computer-readable medium storing code for wireless communication at a user equipment (UE), the code comprising instructions executable by a processor to:
receive configuration information for at least a first sounding reference signal (SRS) resource set and a second SRS resource set, the first SRS resource set and the second SRS resource set each including two or more parameters for an associated SRS transmission;
determine that the first SRS resource set and the second SRS resource set correspond to a same SRS transmission resource, wherein the SRS transmission resource comprises one or more antenna ports, used by an SRS transmission, in a collection of one or more time-frequency resources;
select the first SRS resource set for a first SRS communication using the SRS transmission resource based at least in part on a prioritization associated with each of the first SRS resource set and the second SRS resource set; and
transmit the first SRS communication based at least in part on one or more SRS transmission parameters associated with the first SRS resource set.

31. An apparatus for wireless communication at a user equipment (UE), comprising:
means for receiving configuration information for at least a first sounding reference signal (SRS) resource set and a second SRS resource set, the first SRS resource set and the second SRS resource set each including two or more parameters for an associated SRS transmission;
means for determining that the first SRS resource set and the second SRS resource set correspond to a same SRS transmission resource, wherein the SRS transmission resource comprises one or more antenna ports, used by an SRS transmission, in a collection of one or more time-frequency resources;
means for selecting the first SRS resource set for a first SRS communication using the SRS transmission resource based at least in part on a prioritization associated with each of the first SRS resource set and the second SRS resource set; and
means for transmitting the first SRS communication based at least in part on one or more SRS transmission parameters associated with the first SRS resource set.

32. An apparatus for wireless communication at a base station, comprising:
means for transmitting configuration information to a user equipment (UE) for at least a first sounding reference signal (SRS) resource set and a second SRS resource set, the first SRS resource set and the second SRS resource set each including two or more parameters for an associated SRS transmission;
means for identifying that the first SRS resource set and the second SRS resource set correspond to a same SRS transmission resource, wherein the SRS transmission resource comprises one or more antenna ports, used by an SRS transmission, in a collection of one or more time-frequency resources;

means for determining that the first SRS resource set is associated with the SRS transmission resource based at least in part on a prioritization associated with each of the first SRS resource set and the second SRS resource set; and means for measuring one or more channel characteristics of a SRS transmission received from the UE on the SRS transmission resource based at least in part on one or more SRS transmission parameters associated with the first SRS resource set.

* * * * *